United States Patent
Itou et al.

(10) Patent No.: US 7,573,553 B2
(45) Date of Patent: Aug. 11, 2009

(54) LIQUID CRYSTAL DISPLAY DEVICE

(75) Inventors: Osamu Itou, Hitachi (JP); Shoichi Hirota, Hitachi (JP); Masaya Adachi, Hitachi (JP); Shinichiro Oka, Hitachi (JP)

(73) Assignee: Hitachi Displays, Ltd., Chiba (JP)

( * ) Notice: Subject to any disclaimer, the term of this patent is extended or adjusted under 35 U.S.C. 154(b) by 90 days.

(21) Appl. No.: 11/935,462

(22) Filed: Nov. 6, 2007

(65) Prior Publication Data

US 2008/0106676 A1  May 8, 2008

(30) Foreign Application Priority Data

Nov. 6, 2006   (JP)   ............... 2006-300357

(51) Int. Cl.
*G02F 1/1335*   (2006.01)
(52) U.S. Cl. .............. 349/117; 349/107; 349/106; 349/104; 349/118; 349/119
(58) Field of Classification Search .......... 349/117
See application file for complete search history.

(56) References Cited

U.S. PATENT DOCUMENTS

| | | | | |
|---|---|---|---|---|
| 5,587,821 | A * | 12/1996 | Nakanishi et al. | 349/118 |
| 6,281,952 | B1 * | 8/2001 | Okamoto et al. | 349/12 |
| 6,524,666 | B1 * | 2/2003 | Ichinose et al. | 428/1.3 |
| 6,867,830 | B1 * | 3/2005 | Hirota et al. | 349/96 |
| 7,259,817 | B2 * | 8/2007 | Itou et al. | 349/117 |
| 2004/0263729 | A1 * | 12/2004 | Itou et al. | 349/117 |
| 2006/0221280 | A1 * | 10/2006 | Oka et al. | 349/117 |
| 2008/0079876 | A1 * | 4/2008 | Oka et al. | 349/114 |
| 2008/0198304 | A1 * | 8/2008 | Oka et al. | 349/96 |

FOREIGN PATENT DOCUMENTS

JP   2006-039369   2/2006

OTHER PUBLICATIONS

K. Kogaku, "Crystal Optics and Handling of Polarization Based Upon Poincare Sphere", Japanese Institute of Applied Physics, pp. 146-159.
O. Kogaku, "Applied Optics II 5-3-3 Poincare Sphere", Baifu Kan Publisher, pp. 202-206.
Y. Fujimura, et al. "Optical properties of Retardation Films for STN-LCDs", SID91 Digest, pp. 739-742, 1991.
S. Chandrasekhar, Liguid Crystal:, Second Edition 1992.

* cited by examiner

*Primary Examiner*—Frank G Font
*Assistant Examiner*—Mary A El Shammaa
(74) *Attorney, Agent, or Firm*—Antonelli, Terry, Stout & Kraus, LLP.

(57) ABSTRACT

In a transflective type IPS type liquid crystal display device in which a phase difference layer has been built in a reflection display portion, a retardation value of the phase difference layer corresponding to a short wavelength color filter is different from a retardation value of the phase difference layer corresponding to a long wavelength color filter; while a blue display pixel is set to the short wavelength color filter and both red and green pixels are set to the long wavelength filter, the retardation value of the phase difference layer corresponding to the former-mentioned short wavelength color filter is made smaller than the retardation value of the phase difference layer corresponding to the latter-mentioned long wavelength color filter.

12 Claims, 20 Drawing Sheets

RUL : RUBBING ROLL

POLARIZATION CONVERSION OF LIGHT HAVING WAVELENGTH OF 550 nm

POLARIZATION CONVERSION OF LIGHT IN LONG WAVELENGTH RANGE

POLARIZATION CONVERSION OF LIGHT IN SHORT WAVELENGTH RANGE

LIGHT IS MOVED TO NORTH POLE OF POINCARÉ SPHERE (1)

LIGHT IS MOVED TO NORTH POLE OF POINCARÉ SPHERE (2)

LIGHT IS MOVED TO SOUTH POLE OF POINCARE SPHERE (1)

LIGHT IS MOVED TO SOUTH POLE OF POINCARÉ SPHERE (2)

LIQUID CRYSTAL DISPLAY DEVICE

CLAIM OF PRIORITY

The present application claims priority from Japanese application JP-2006-300357 filed on Nov. 6, 2007 the content of which is hereby incorporated by reference into this application.

BACKGROUND OF THE INVENTION

The present invention generally relates to a transflective type IPS type color liquid crystal display device. More specifically, the present invention is directed to a phase difference layer of a reflection display portion of the color liquid crystal display device.

Portable type information appliances which are typically known as cellular phones will be firmly progressed with having multiple functions and high performance also in near future, while storage capacities of storage devices thereof are increased and communication speeds thereof are increased. Also, with respect to display devices functioning as interfaces for these portable type information appliances, these display devices are necessarily required to be drivable in response to larger capacities of image information. To this end, these display devices are required to be capable of realizing high image qualities as well as high precision displays. More concretely speaking, as to the high image qualities, high contrast ratios, high color reproducible characteristics, wide view angles, and outdoor visibility may be listed up.

While the portable type information appliances may be utilized under various sorts of environments, these information appliances are operable under the direct rays of the sun in midsummer as a limit of light environments, whereas these information appliances are operable in darkrooms as a limit of dark environments. In order to achieve relatively better displays under all of these various environments, there are many possibilities that transflective type liquid crystal devices are employed.

IPS (In-Plane Switching) type liquid crystal display devices are capable of displaying thereon images at wide view angles and in high contrast ratios. Such transflective IPS type liquid crystal display devices have been proposed by modifying the above-described IPS type liquid crystal display devices.

On the other hand, very recently, while material techniques of coating type phase plates have been progressed, if these coating type phase plates are selectively formed on reflection display portions contained in pixels of transflective type liquid crystal display devices, then transmission display portions can be made to have the same structures as those of transmission type IPS systems. As a result, in the transflective type liquid crystal display devices, the reflection display portions are capable of displaying thereon display contents at wide view angles and in high contrast ratios, which are similar to those of the transmission type IPS systems. The resulting liquid crystal display device will be referred to as a "phase plate built-in type transflective IPS liquid crystal display device."

Generally speaking, in a reflection type liquid crystal display device, a polarization condition of light which reaches a reflection layer is converted to a circularly polarized light condition, so that a dark display may be realized. The basic idea of such a dark display may be similarly applied to a reflection display portion of a transflective type liquid crystal display device, and furthermore, may be similarly applied also to a reflection display portion of a phase plate built-in type transflective IPS liquid display device.

Assuming now that one pair of substrates which sandwiches a liquid crystal layer are constituted by a first substrate and a second substrate, there is such a selection that a phase difference layer is formed on any one of the first and second substrates. Assuming now that such a substrate which is located near a light source for irradiating visible light onto the liquid crystal layer is defined as the second substrate and another substrate is defined as the first substrate, the second substrate has various sorts of the wiring lines, electrodes, and active elements, so that a layer structure of this second substrate is considerably complex, as compared with a layer structure of the first substrate having a color filter. As a consequence, it is readily possible to form the phase difference layer on the side of the first substrate having the simpler layer structure. As a result, the liquid crystal layer is arranged in the vicinity of the reflection layer, as compared with the phase difference layer.

The light which reaches the reflection layer is converted into circularly polarized light by employing this phase difference layer and the liquid crystal layer so as to realize a dark display. In this case, in accordance with a technical idea of a broadband circular polarizing plate, if the liquid crystal layer located near the reflection layer is constructed as a quarter-wave plate and the phase difference layer is constructed as a half-wave plate, then either circularly polarized light or such a polarization condition close to this circularly polarized light may be realized with a wide range of a visible wavelength range.

If a reduction of a reflectance of a dark display has a top priority, then a design for a reflection display portion of a phase plate built-in type transflective IPS liquid crystal display device may be exclusively determined based upon this factor.

If the liquid crystal layer is made of the quarter-wave plate, then a retardation value thereof must be selected to be approximately 140 nm. As a result, even when such a liquid crystal material having the smallest birefringent value is employed, a thickness of the liquid crystal layer must be made smaller than, or equal to 2 μm. In this case, an influence caused by orientation control force of an orientation film is large which is given to the liquid crystal layer, and thus, an orientation change of the liquid crystal layer can hardly occur when a voltage is applied thereto. The orientation change of the liquid crystal layer when an electric field is applied is small, and a reflectance of light display is lowered.

In order to improve the reflectance of the light display, the thickness of the liquid crystal layer of the reflection display portion must be increased. However, at this time, the retardation value of the liquid crystal layer of the reflection display portion is considerably larger than the quarter wavelength, so that an ideal broadband circularly polarizing plate cannot be formed. As a secondary solution idea capable of lowering the reflectance of the dark display, it is conceivable that the retardation value of the phase difference layer is increased in conjunction with the retardation value of the liquid crystal layer. If thickness of the liquid crystal layer of the reflection display portion is slightly increased, then a relatively lower reflectance of the dark display may be achieved. However, the reflectance of the dark display is increased in connection with such a condition that the retardation value is increased from the quarter wavelength.

If light having such a wavelength near a wavelength of 550 nm where a visual sensitivity becomes maximum is designed to become circularly polarized light, then a reflectance of luminance brightness can be reduced. As a result, in the most case, a retardation value is designed, while the wavelength near the wavelength of 550 nm is defined as a reference.

In the case of the phase plate built-in type transflective IPS liquid crystal display device, in particular, an increase in reflectance of a short wavelength range becomes conspicuous in connection with such a condition that the thickness of the liquid crystal layer of the reflection portion is increased. Although the reflectance of the light display may be increased, the reflectance of the dark display is increased as a secondary effect thereof, and furthermore, the liquid crystal display is colored in blue. For instance, JP-A-2006-39369 (will be referred to as "patent publication 1" hereinafter) has described such a transflective type liquid crystal display device that retardation values of built-in phase plates are changed with respect to each of respective color filters. However, the transflective type liquid crystal display device of the patent publication 1 is not made as an IPS type liquid crystal display device, so that transmission displays having high contrast ratios cannot be achieved in wide visual angles.

SUMMARY OF THE INVENTION

The present invention is featured by that in a phase plate built-in type IPS liquid crystal display device, a reflectance of a light display can be improved, and, at the same time, a reflectance of a dark display can be improved.

In a liquid crystal display device, color filters have been employed for a color display purpose, which may correspond to such a technical idea that an area has been subdivided into a plurality of sub-areas for color displays, and respective pixels have been allocated to the respective colors. While a thickness of a liquid crystal layer of a reflection portion is increased, a reflectance of a short wavelength range is increased. This reason is given as follows: That is, light in the short wavelength range, which reaches a reflection layer of the liquid crystal display device, has been largely shifted from circularly polarized light. In this case, there are large amounts of light reflections from pixels corresponding to a blue color filter. Accordingly, a retardation value of such a phase difference layer only for the pixel corresponding to the blue color filter may be changed in order that a polarization status of light entered to a reflection layer of the blue pixel may be approximated to the circularly polarized light.

In order to change the retardation value of the phase difference layer only for the pixel corresponding to the blue color filter, for instance, such phase difference layers having different retardation values from each other may be alternatively and separately formed plural times with respect to the blue pixel, and the red and green pixels, respectively. However, in this alternative case, manufacturing steps become cumbersome, and moreover, a total number of layers formed on a first substrate is increased, so that an optical transmittance is lowered, resulting in an undesirable effect. In order to realize the above-described purpose while manufacturing steps are kept simple, for example, a light irradiation amount when a phase difference layer is formed may be alternatively reduced only for the blue pixel.

A phase difference layer is manufactured as follows: That is, an optical polymerization liquid crystal molecule solution such as diacrylic-series liquid crystal is coated on an underground orientation film under liquid crystal phase condition; the coated orientation film is orientated along an orientation direction of the orientation film; the resulting orientation film is solved by a solvent under this condition; and furthermore, light is irradiated onto the resulting orientation film so as to optically polymerize acrylic groups of molecular trails with each other, so that the resulting orientation film is solidified while the orientation status in the liquid crystal phase is essentially maintained.

When the phase difference layer formed in the above-described manner is put for a long time under high temperature condition, lowering of a retardation value thereof occurs. This mechanism may be explained based upon, for instance, a thermal relaxation mechanism. That is, since the orientation status in the liquid crystal phase is not always under the most stable status in view of the thermodynamic idea when the orientation film is solidified, a thermal relaxation is produced by a heating process which is performed after the phase difference layer has been formed, so that the orientation status is disturbed. As a result, the retardation value is lowered. At this time, if a couple forming rate caused by the optical polymerization reaction is high, then the orientation status in the liquid crystal phase is strongly held, so that the thermal relaxation can hardly occur. However, if a light irradiation amount is small and a couple forming rate is low, then the orientation status may be readily deformed, and lowering of the retardation value caused by the thermal relaxation may readily occur.

In accordance with the present invention, while utilizing a difference in the decreases of the retardation values which are caused by a difference in the light irradiation amounts, the retardation value of the phase difference layer as to only the pixel corresponding to the blue color filter is changed. In other words, if the light irradiation amount as to only the blue pixel is decreased when the phase difference layer is formed, then the thermal relaxation is excessively produced by the heating process after the phase difference layer has been formed, so that the retardation value only for the phase difference layer corresponding to the blue pixel is excessively decreased. In this case, although the film thickness of the phase difference layer are common with respect to the respective colors, the birefringence values are different from each other.

In order that the light irradiation amount only for the blue pixel is decreased when the phase difference layer is formed, either a half tone mask or a gray scale mask may be employed when the light is irradiated. The half tone mask reduces an averaged light irradiation amount based upon very small drawing smaller than, or equal to a resolution limit. As the very small drawing smaller than, or equal to the resolution limit, there are a very fine stripe-shaped pattern and the like. The gray scale mask reduces the light irradiation amount by a semi-transparent portion.

Alternatively, as to the layer thickness of the phase difference layer, only such a layer thickness corresponding to the blue pixel may be decreased. More concretely speaking, a film thickness forming layer is formed in correspondence with the blue pixel prior to forming of the phase difference layer. When optical polymerization liquid crystal molecules are coated on this formed film thickness difference forming layer under liquid crystal phase condition, the layer thickness on the film thickness difference forming layer is made thin due to the fluidability thereof. If the light is irradiated onto the film thickness difference forming layer at the same irradiation amounts commonly for the respective colors under this condition, and the irradiated layer is solidified, then such a phase difference layer having a thinner layer thickness only for the blue pixel may be formed.

As previously described, in accordance with the present invention, since the half tone mask and the gray scale mask are employed, the light irradiation amount during a single light irradiating operation can be reduced only for the phase difference layer corresponding to the blue pixel. As a consequence, while the process steps are not made cumbersome (for example, total time of light irradiation operations is increased, and total number of forming operations for phase difference layer is increased), the retardation value only for the phase difference layer corresponding to the blue pixel can be decreased. As a result, in the transflective IPS type liquid crystal display device, the transmission display of the high contrast ratio can be realized with the wide view angle, and furthermore, the reflection display of the high contrast ratio can be realized in the high reflectance.

Also, if the liquid crystal display device of the present invention is employed as an interface of a mobile appliance such as a cellular phone, then high image quality displays can be obtained under various sorts of environments which include darkrooms up to outdoor under direct rays of the sun. In near future, there is such a trend that image data having large storage capacities are handled in conjunction with improvements in communication speeds. Also, in such a case, the liquid crystal display device of the present invention can precisely reproduce the contents of high image qualities under all of various environments.

Other objects, features and advantages of the invention will become apparent from the following description of the embodiments of the invention taken in conjunction with accompanying drawings.

DESCRIPTION OF THE INVENTION

Referring now to drawings, a description is made of embodiments of the present invention.

Embodiment 1

Figure 1:
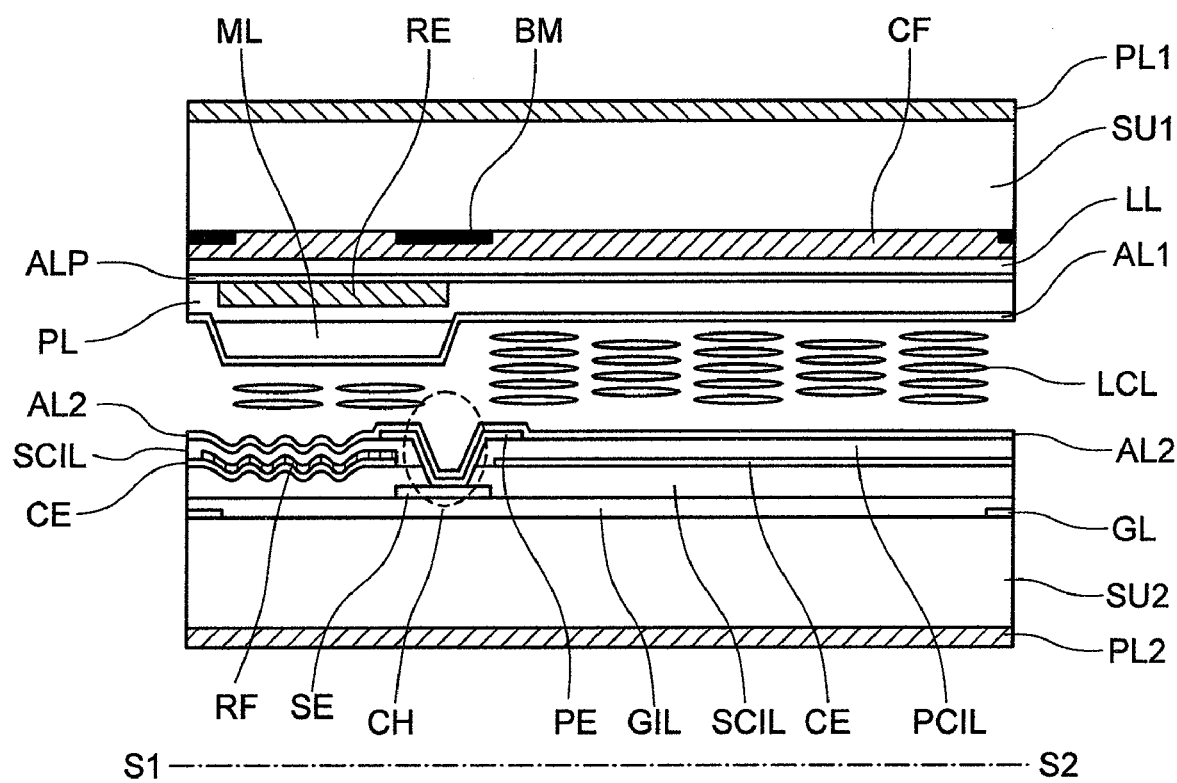
FIG. 1 is a sectional view for representing 1 pixel of a liquid crystal display device according to an embodiment 1 of the present invention.
Figure 2:
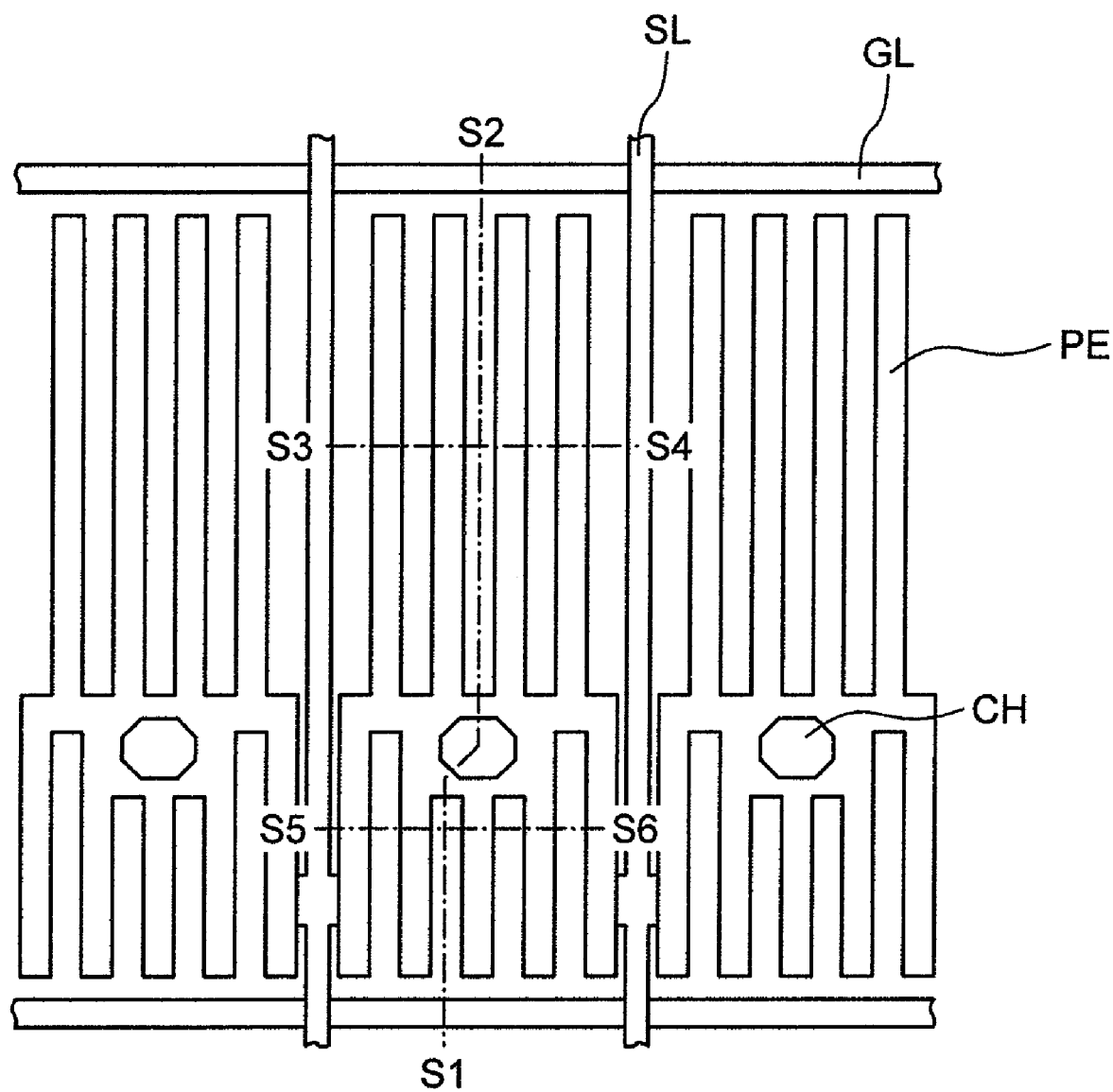
FIG. 2 is a plane view for showing a structure formed on a second substrate SU2 of the liquid crystal display device according to the embodiment 1.
Figure 3:
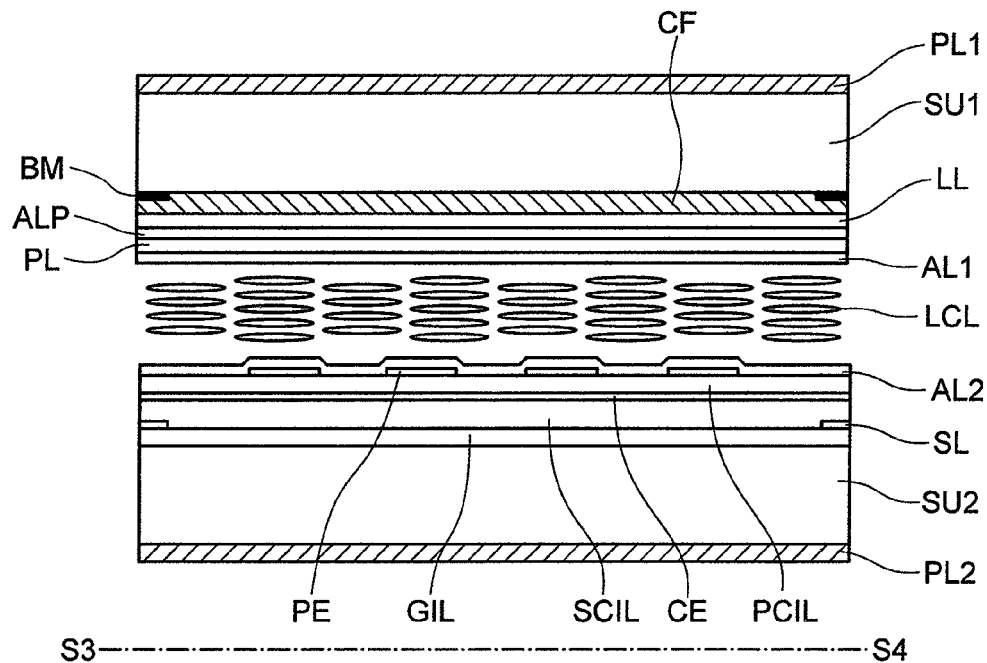
FIG. 3 is a sectional view for indicating a transmission display portion of the liquid crystal display device according to the embodiment 1.
Figure 4:
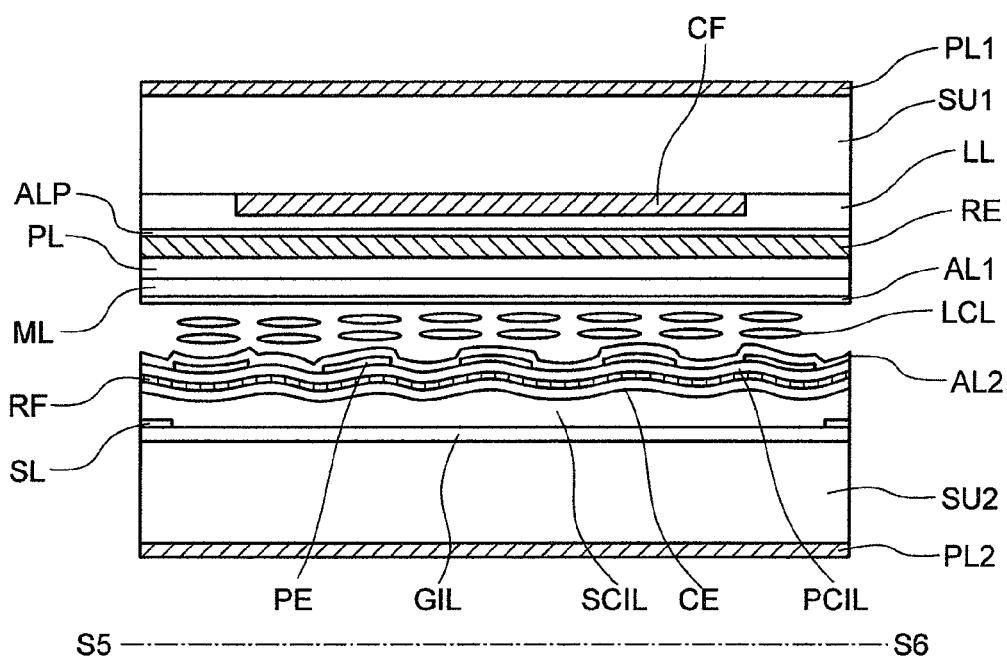
FIG. 4 is a sectional view for indicating a reflection display portion of the liquid crystal display device according to the embodiment 1.

Sectional planes of 1 pixel of a liquid crystal display device according to the present invention are schematically indicated in FIG. 1, FIG. 3, and FIG. 4. It should be understood that cutting lines in the respective cutting sectional planes are represented in FIG. 2.

A liquid crystal display panel is constructed by employing a first substrate "SU1" and a second substrate "SU2", while the first substrate "SU1" and the second substrate "SU2" sandwich a liquid crystal layer "LCL." The first substrate SU1 and the second substrate SU2 are equipped with orientation films "AL1" and "AL2" on planes located in the vicinity of the liquid crystal layer LCL, while these orientation films "AL1" and "AL2" are employed so as to stabilize an orientation status of the liquid crystal layer LCL. Also, a means for applying a voltage to the liquid crystal layer LCL is provided on a plane located in the vicinity of the liquid crystal layer LCL of the second substrate SU2. Also, as represented in FIG. 1, an area within the 1 pixel has been divided into a transmission display portion and a reflection display portion in an area dividing manner. FIG. 3 and FIG. 4 are sectional planes of the transmission display portion and the reflection display portion, respectively.

The first substrate SU1 is made of boric silicic acid glass having a superior transparent characteristic and a superior flat characteristic, and further, contains a small amount of ionic impurities, while a thickness of the first substrate SU1 is approximately 400 μm. In the first substrate SU1, the first orientation film AL1, a stepped portion forming layer ML, a protection film PL, a phase difference layer RE, a phase difference layer orientation film ALP, a flattening layer LL, a color filter CF, and a black matrix BM have been stacked on each other from the side close to the liquid crystal layer LCL.

Both the first orientation film AL1 and the phase difference layer orientation film ALP are organic polymer films of polyimide series, and have been orientation-processed by a rubbing method, and also, correspond to so-called "horizontal orientation films" which give a pre-tilt angle of approximately 2 degrees to the liquid crystal layer LCL located close to these orientation films AL1 and ALP. The protection film PL and the flattening layer LL are made of acrylic-series resins, and have such functions having superior transparent characteristics, are capable of flattening concaves and convexes of under layers thereof, and further, are capable of preventing penetrations of solvents. Similar to the protection layer PL and the flattening layer LL, the stepped portion forming layer ML is made of an acrylic-series resin, and is distributed only over a portion corresponding to the reflection display portion. The color filter CF contains a flat plane structure in which stripe-shaped filter portions representative of red, green, and blue colors have been repeatedly arranged. The black matrix BM is made of a block-colored resist, and contains a grid-shaped flat plane distributed structure which may be adapted to a pixel boundary portion.

Similar to the first substrate SU1, the second substrate SU2 is made of boric silicic acid glass, and has a thickness of approximately 400 μm. The second substrate SU2 is mainly equipped with the second orientation film AL2, a pixel electrode PE, an interlayer insulating film PCIL, a common electrode CE, an active element connected to a source electrode SE, a scanning wiring line GL, and a signal wiring line SL shown in FIG. 2 in this order from the side close to the liquid crystal layer LCL.

Similar to the first orientation film AL1, the second orientation film AL2 is a horizontal orientation film which is made of an organic polymer film of a polyimide series. The pixel electrode PE and the common electrode CE are indium tin oxides (ITO) each having both a transparent characteristic and an electric conductivity, while a layer thickness thereof is 100 nm. While the pixel electrode PE has been separated from the common electrode CE by the interlayer insulating film PCIL made of a silicon nitride, a layer thickness of the interlayer insulating film PCIL is 300 nm.

A plane-viewed shape of the pixel electrode PE is a comb tooth shape, whereas the common electrode CE has been distributed over a substantially entire plane of the respective pixels. Since the pixel electrode PE has been separated from the common electrode CE by the interlayer insulating film PCIL, arch-shaped electric lines of force are formed between both the electrodes PE and CE in such a manner that these arch-shaped electric lines of force are extruded into the liquid crystal layer LCL when a voltage is applied. This is a so-called "lateral electric field" having a parallel component with respect to the substrate plane, and is an IPS system for deforming the orientation status of the liquid crystal layer LCL in order to be rotated mainly within the plane.

In the IPS system, since there is a small increase in the tilt angle of the liquid crystal layer LCL when the voltage is applied, a wide view angle display can be achieved which has a superior gradation display characteristic along a view angle direction.

Also, in FIG. 3 and FIG. 4, there are large numbers of such portions that the pixel electrodes PE are overlapped with the common electrode CE. Since these portions have been coupled parallel with respect to the liquid crystal layer LCL, these portions function as holding capacitances which hold applied voltages during holding time periods as constant voltages.

In addition, a reflection layer RF is provided on the upper side of the common electrode CE in the reflection display portion of the second substrate SU2. Furthermore, a concave/convex forming layer is formed on the lower layer of the common electrode CE, which gives a large number of very fine and gentle concaves/convexes on the surface of the reflection layer RF. This concave/convex forming layer is made of an organic insulating film which insulate either the common electrode CE and the signal wiring lines SL or the scanning wiring lines GL. A surface of this organic insulating film is etched, and thereafter, heated so as to be brought into a melting condition. The surface of the organic insulating film is formed as gentle concaves and convexes by utilizing surface tension at this time, and then, the gentle concaves/convexes are solidified so as to be formed as the concave/convex forming layer. Since the reflection layer RF of the upper plane becomes such a shape in correspondence with the concave/convex forming layer, the reflection layer RF may have a large number of very fine planes which are inclined with respect to the macroscopic layer flat plane, and thus, a diffusion reflection.

It should also be noted that if a relationship between a light source and an observation direction is changed, then reflection luminance of a mirror reflection is changed with dizzy rapidity, so that this mirror reflection is not desirable in view of visibility. As a consequence, the reflection luminance of the diffusion reflection is relatively hardly changed even when the relationship between the light source and the observation direction is changed, so that a reflection display plane having a high grade can be obtained which is approximated to such a perfect diffusion plane as paper.

As shown in FIG. 2, the signal wiring line SL are intersected with the scanning wiring lines GL. The portions located in the vicinity of the intersection portions between the signal wiring lines SL and the scanning wiring lines GL contain active elements respectively, and the active elements correspond to the pixel electrodes PE in an 1-to-1 relationship. A potential is applied from the relevant signal wiring line SL via the relevant active element to a pixel electrode PE, so that an operation of the active element is controlled by the relevant scanning wiring line GL. The above-described active element is a thin-film transistor, the channel portion of which is manufactured by a polysilicon layer having a relatively high electron mobility. The polysilicon layer is formed in such a manner that an amorphous silicon layer made by a CVD (Chemical Vapor Deposition) method is heated by laser light so as to be sintered. The respective pixel electrodes PEs have rectangular shapes, while these pixel electrodes PEs are independently controlled, and furthermore, have been arrayed in a grid shape on the second substrate SU2.

In the transmission display portion, light passes through the color filter CF only 1 time, whereas in the reflection display portion, since the light is reflected by the reflection layer RF, the light passes through the color filter CF 2 times. As a consequence, if the same color filters CF are employed in both the transmission display portion and the reflection display portion, then an effective transmittance of the latter-mentioned display portion (namely, reflection display portion) becomes lower than that of the former-mentioned display portion (namely, transmission display portion). Moreover, since externally supplied incident light is used as the light source of the reflection display portion, the reflection display portion cannot achieve the light display in such a case that the surrounding area does not sufficiently become light.

Figure 5:
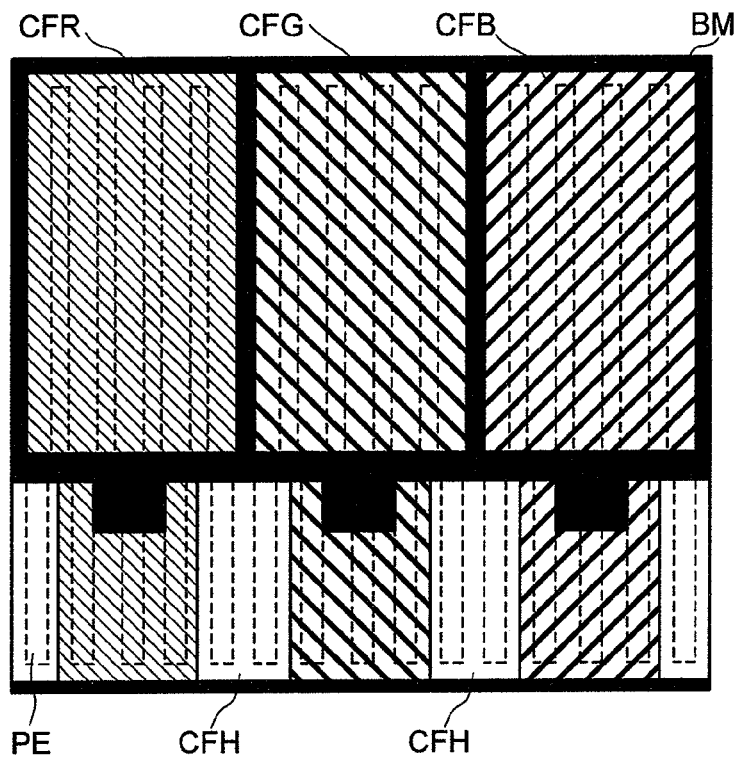
FIG. 5 is a plane view for showing a structure formed on a first substrate SU1 of the liquid crystal display device according to the embodiment 1.

Accordingly, in order to achieve the light reflection display under more wider environments, the transmittance of the color filter CF employed in the reflection display portion is made higher than that of the transmission display portion. Concretely speaking, as shown in FIG. 5, while color filter empty portions "CFH" in which the color filter CF is not present are arranged in the reflection display portion, the reflection display is made by performing an additive color mixture between the color filters CF and the color filter empty portions CFH. In a color filter empty portion CFH, since there is no light absorption by a color filter CF, a reflectance thereof is high, and although a color purity is lowered by performing the additive color mixture with the color filter CF, a lighter reflection display may be made.

In this case, FIG. 5 is a plane view of the first substrate SU1, and indicates a flat plane distribution of the color filters CF and the black matrix BM of the liquid crystal display device according to the embodiment 1. FIG. 5 contains areas which correspond to 3 pixels, which are a red color filter CFR, a green color filter CFG, and a blue color filter CFB from the left side thereof. Also, even when the thickness of the color filter CF of the reflection display portion is reduced, a similar effect may be achieved.

Figure 6:
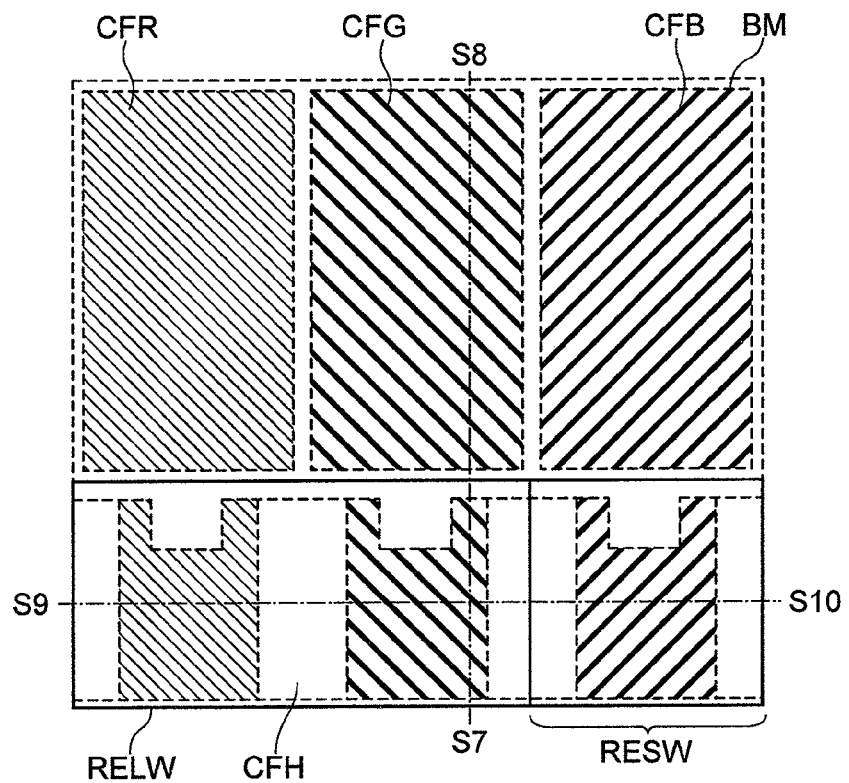
FIG. 6 is a plane view for showing another structure formed on the first substrate SU1 of the liquid crystal display device according to the embodiment 1.

FIG. 6 is a plane view of the first substrate SU1 similar to FIG. 5, and represents a flat plane distribution of the phase difference layer RE in addition to the color filters CF and the black matrix BM. In order to display the flat plane distribution of the phase difference layer RE, the black matrix BM has been indicated by placing a white frame on a colored background, although the white frame representation is different from the actual frame representation. The phase difference layer RE is constructed by employing a short wavelength phase difference layer RELW, and a long wavelength phase difference layer RESW, while a boundary between the portion where the phase difference layer RE is present and the portion where the phase difference layer RE is not present along an upper/lower direction is located over the horizontal black matrix BM. Also, a boundary between the short wavelength phase difference layer RELW and the long wavelength phase difference layer RESW along a right/left direction is located at a boundary between the green pixel and the blue pixel.

A liquid crystal layer represents a nematic phase within a wide temperature range containing the room temperature, and shows such a positive anistropic dielectric constant that a dielectric constant of a liquid crystal orientation direction is larger than a dielectric constant of a vertical direction. In addition, since the liquid crystal layer represents a higher resistance, there is a sufficiently small voltage drop even in a holding time period during which an active element is turned OFF, and thus, there is no lowering of the transmittance during the holding time period, but also, a so-called "flicker phenomenon" never occurs. After the orientation process operation is carried out with respect to a first orientation film and a second orientation film by the rubbing method, a first substrate and a second substrate are assembled, and then, a liquid crystal material is sealed into a space between the first substrate and the second substrate under vacuum condition in order to constitute the above-described liquid crystal layer.

Since the orientation processing direction as to the first orientation film and the second orientation film are directed not parallel to each other, the orientation of the liquid crystal layer is formed as homogeneous orientation whose orientation status is stable. This orientation direction is defined as 10 degrees with respect to the comb tooth direction of the signal wiring line, and is defined as 80 degrees with respect to a lateral electric field which is generated when voltage is applied to the liquid crystal device. As a result, a sufficiently large orientation change of the liquid crystal layer when the voltage is applied to the liquid crystal device. In addition, an orientation changing direction during the application of the voltage is exclusively determined, namely, a rotation direction (either clockwise direction or counter clockwise direction) of the liquid crystal layer within the layer is exclusively determined, so that the stable orientation change is obtained.

As shown in FIG. 1, a first polarizing plate "PL1" and a second polarizing plate "PL2" have been arranged outside the first substrate SU1 and the second substrate SU2. While the first polarizing plate PL1 and the second polarizing plate PL2 contain iodine-series dye, iodine has constituted a polymer within the polarizing plates PL1 and PL2. Due to dichroism thereof, the polarizing plates PL1 and PL2 convert natural light entered thereto into linearly polarized light having a sufficiently high polarization degree. While the orientation direction of the polymer of the iodine-series dye is an absorption axis, the absorption axes of the first polarizing plate PL1 and of the second polarizing plate PL2 are intersected with each other at a right angle, as viewed from the normal line direction of the plane, and also, the absorption axis of the first polarizing plate is located parallel to the liquid crystal orientation direction.

FIG. 7A to FIG. 7E are schematic diagrams for indicating a forming process of a phase difference layer, and describe a sectional plane along a broken line S7-to-S8 shown in FIG. 6. In FIG. 7A to FIG. 7E, the color filters CF and the flattening layers LL located on the first substrate SU1 have been omitted.

Figure 7A:
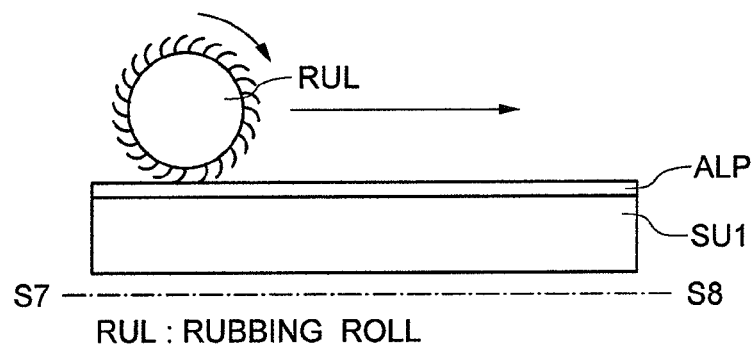
FIG. 7A to FIG. 7E are diagrams for representing a process for forming a phase difference layer of the embodiment 1.
Figure 7B:
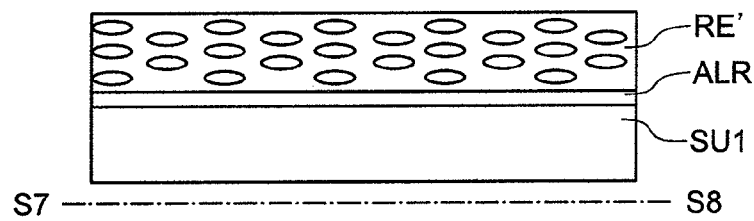

FIG. 7A indicates such a condition that the phase difference layer orientation film ALP is orientation-processed by executing the rubbing method. As shown in FIG. 7B, a phase difference layer RE' before being completed represents a homogeneous orientation along the orientation process direction of the phase difference layer orientation film ALP. An original material for constructing the phase difference layer RE' is a diacrylic-series liquid crystal mixture. This diacrylic-series liquid crystal mixture is melted in an organic solvent in combination with an optical reaction starting agent, and then, the melted material is coated on the phase difference layer orientation film ALP by a spin coating means, or a printing means. Although the coated material is under solution condition just after the coating process, the coated material is orientated along the orientation direction of the phase difference layer orientation film while the solvent is vaporized.

Figure 7C:
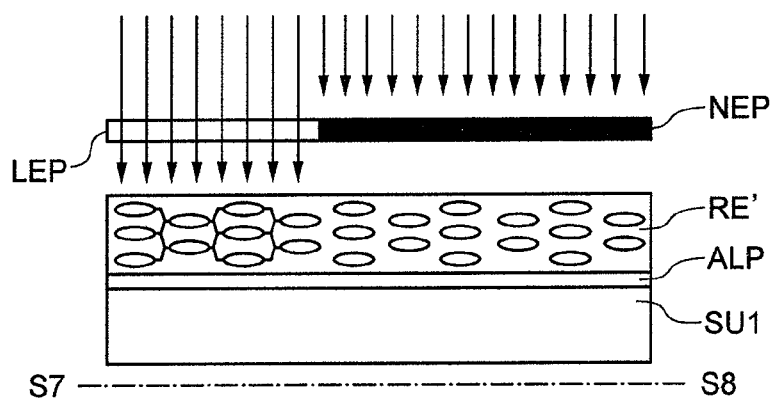

As shown in FIG. 7C, ultraviolet rays are irradiated to the resulting phase difference layer RE' in order that acrylic groups of molecular tails are polymerization-reacted with each other. At this time, although oxygen may constitute a blocking factor for the polymerization reaction, if concentration of the optical reaction starting agent is sufficiently high, then the optical reaction may be progressed at a sufficiently high speed. As indicated in the left side of FIG. 7C, the ultraviolet rays-irradiated phase difference layer RE' is brought into such a condition that liquid crystal molecules indicated by ellipses have been substantially completely coupled to each other.

Figure 7D:
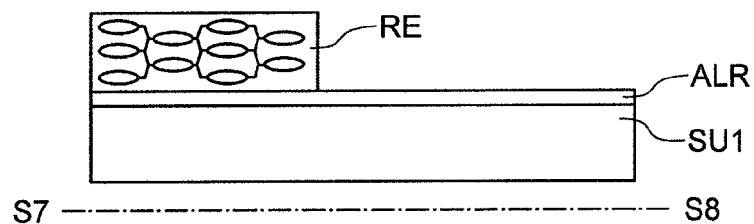

FIG. 7D indicates such a condition that the resulting phase difference layer RE' has been developed by an organic solvent, and thus, a phase difference layer RE is formed only on the light irradiating portion. While the orientation status in the liquid crystal layer is essentially maintained, the liquid crystal layer is solidified so as to form a phase difference layer RE in accordance with the above-described forming manner.

Figure 7E:
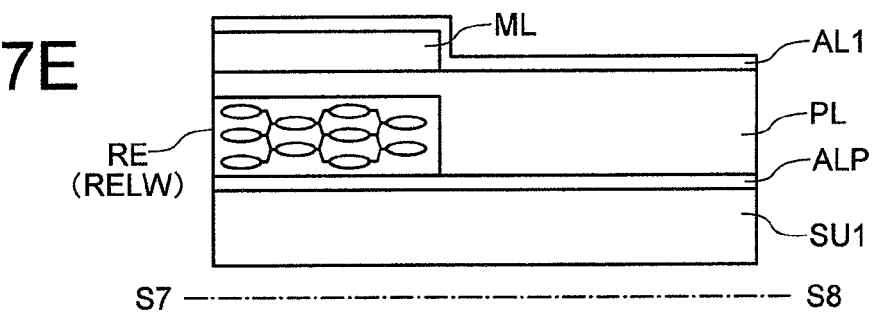

As represented in FIG. 7E, thereafter, the phase difference layer RE is heated in the respective processes for forming a protection film PL and a first orientation film AL1. Since the phase difference layer RE is positioned under high temperature condition, a retardation value is decreased. However, the decrease of the retardation value is substantially directly proportional to a time duration required for setting the phase difference layer RE under the high temperature condition if the temperature of the high temperature condition is constant. As a result, an initial retardation value is set by considering the above-explained direct proportional relationship.

The reason why a retardation value is decreased since a phase difference layer is located under high temperature condition may be explained based upon, for instance, a thermal relaxation mechanism. When the phase difference layer is solidified, an orientation status in a liquid crystal phase is not always under most stable condition in view of a thermodynamic aspect, so that a thermal relaxation occurs when the phase difference layer is heated, and thus, an orientation status is disturbed. As a result, the retardation value is lowered. At this time, if a couple forming rate caused by the optical polymerization reaction is high, then the orientation status in the liquid crystal phase is strongly held, so that the thermal relaxation can hardly occur. However, if a light irradiation amount is small and a couple forming rate is low, then the orientation status may be readily deformed, and lowering of the retardation value caused by the thermal relaxation may readily occur. As a consequence, if the couple forming rates caused by the light irradiation amounts are different from each other, then the lowering amounts of the retardation values are different from each other even when the phase difference layer receives the same heating processes.

Figure 8:
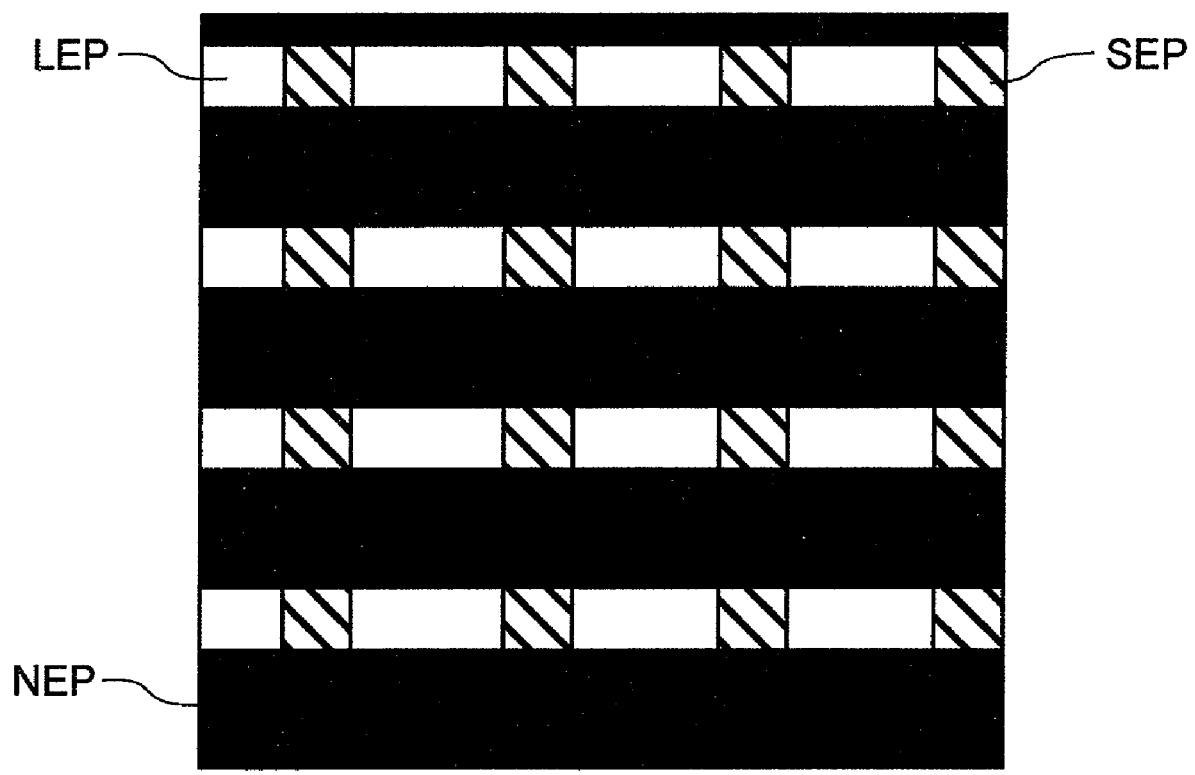
FIG. 8 is a plane view for showing a photomask which is employed in a patterning process of the phase difference layer.

FIG. 8 is a plane view of a photomask which is employed in FIG. 7C when the phase difference layer is exposed. In this photomask, while portions capable of penetrating therethrough light have been distributed in a stripe shape, there are a portion through which the light is largely transmitted, and another portion through which the light is slightly transmitted among these stripes. The former-mentioned portion corresponds to a long wavelength phase difference layer exposing portion LEP, whereas the latter-mentioned portion corresponds to a short wavelength phase difference layer exposing portion SEP. It should also be understood that symbol "NEP" indicates a non-exposing portion.

FIG. 9A to FIG. 9E represent a difference in the forming process of the phase difference layer shown in FIG. 7A to FIG. 7E and another process thereof. FIG. 9A to FIG. 9E show sectional planes along a broken line S9 to S10 shown in FIG. 6.

Figure 9A:
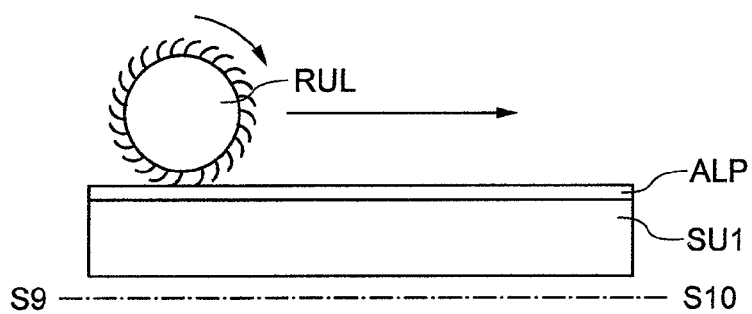
FIG. 9A to FIG. 9E are diagrams for showing another process for producing the phase difference layer of the embodiment 1.
Figure 9B:
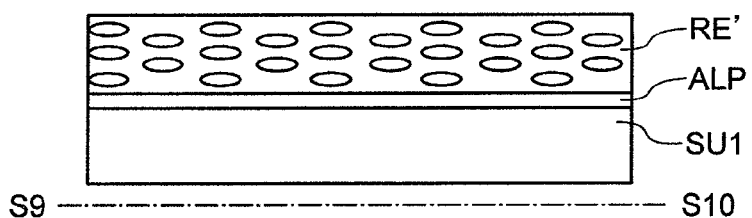
Figure 9C:
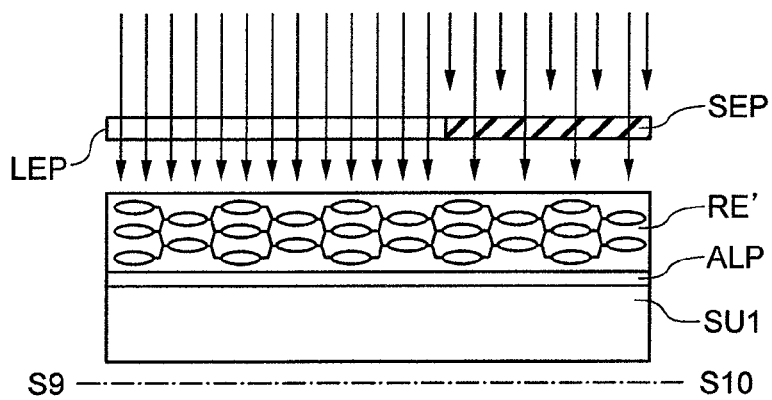
Figure 9D:
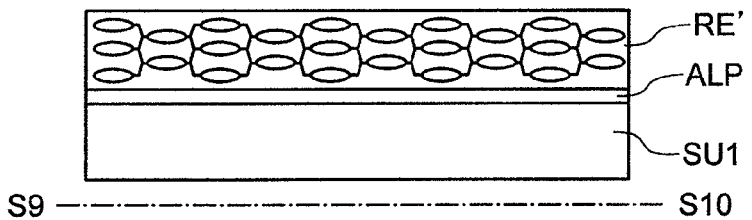
Figure 9E:
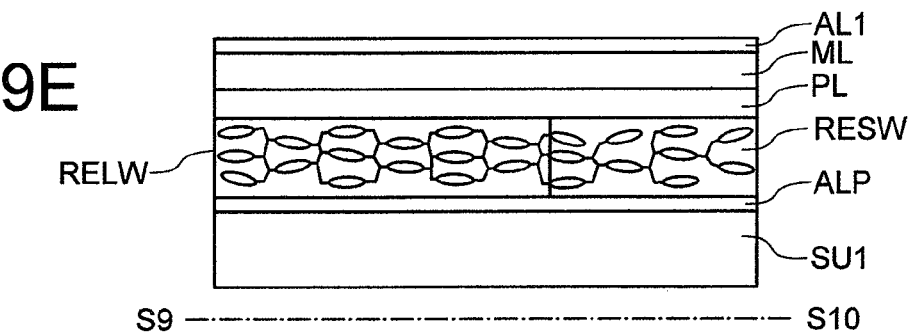

The process steps of FIG. 9A and FIG. 9B are identical to those of FIG. 7A and FIG. 7B. In FIG. 9C, although an entire area of the phase difference layer is irradiated by light, which is different from FIG. 7C, irradiation amounts for a left-sided portion and a right-sided portion are different from each other, namely, the irradiation amount for the right-sided portion is smaller than that of the left-sided portion. As a consequence, in the right-sided portion, liquid crystal molecules shown by ellipses have been essentially perfectly coupled to each other, there is such a portion on the right side where liquid crystal molecules are not coupled to each other. As shown in FIG. 9D, when the phase difference layer is organic-developed, any of these portions are left. As to an orientation status after the phase difference layer has been treated by a heating process, as indicated in FIG. 9E, in a portion whose light exposing amount is small, since coupling of the liquid crystal molecules becomes imperfect, orientation is largely disturbed.

A phase difference layer is required in a reflection display portion, but is not required in a transmission display portion. When the phase difference layer is formed in the transmission display portion, a contrast ratio of a transmission display is lowered, whereas if the phase difference layer is not present in the reflection display portion, then a contrast ratio of a reflection display is lowered. In addition, the phase difference layer may be formed, or may not be formed in an untransparent portion which does not belong to the reflection display portion and the transmission display portion. As a consequence, the phase difference layer is formed only in any portions other than such a portion corresponding to the transmission display portion formed on the second substrate SU2.

A contrast ratio of a reflection display is approximately 30:1 even at its maximum, whereas a contrast ratio of a transmission display may be sometimes amounted to 1000:1. As a consequence, in a transflective liquid crystal display device, there are many possibilities that a contrast ratio of a transmission display has a top priority. In the case that a boundary of a reflection display portion is located close to a boundary of a transmission display portion, a boundary of a phase difference layer is arranged to be located within the reflection display portion in the designing view point by considering that a fluctuation occurs in the boundary of the phase difference layer.

Concretely speaking, while a photomask is employed when a phase difference layer before being completed is irradiated by light, the light is irradiated only to such a portion where the phase difference layer is required so as to be solidified. Since a portion on which the light is not irradiated is not solidified, this portion is cleaned by using an organic solvent, and the like so as to be removed. In this case, the phase difference layer is physically removed from the transmission portion, so that an influence caused by this phase difference layer can be completely removed. Alternatively, as to such a portion corresponding to the transmission display portion, at a stage where a diacrylic-series liquid crystal mixture has been coated on this portion, the coated portion is heated so as to be formed as an isotropic layer; and under this isotropic layer status, light is irradiated, so that the coated portion may be solidified while maintaining the isotropic phase. In this alternative case, the organic developing process is no longer required.

Optical axis directions as to a first polarizing plate, a phase difference layer, and a liquid crystal layer of a reflection display portion, and also retardations as to the phase difference layer and the liquid crystal layer of the reflection display portion are determined in a similar manner to those of a broadband quarter-wave plate. While a broadband quarter-wave plate has such a structure that a polarizing plate, a half-wave plate, and a quarter-wave plate are sequentially stacked on each other, this broadband quarter-wave plate has the following function: That is, within a wider wavelength range of a visible wavelength range while a wavelength of 550 nm is located at a center thereof, this broadband quarter-wave plate converts incident polarized light into either circularly polarized light or such a light having a polarization status very close to the circularly polarized light.

A basic idea of the above-described function will now be described with reference to a display of the Poincaré sphere. A detailed description as to the Poincaré sphere display is described in various books such as "Kessyou Kogaku (crystal optics)" published from MORIKITA publisher and edited by the Japanese institute of APPLIED PHYSICS; and "Ohyo Kogaku (applied optics) II" written by Kunio Tsuruta and issued from Baifu Kan publisher. In the below-mentioned explanations, assuming now that the Poincaré sphere is recognized as the earth, cross points between an S3 axis and the Poincaré sphere are referred to as the North Pole and the South Pole; and a cross line among an S1 plane, an S2 plane, and the Poincaré sphere will be referred to as the equator. In this assumption, both the North Pole and the South Pole represent circularly polarized light; the equator represents linearly polarized light; and other portions indicate elliptical polarization. Also, the S1 axis, the S2 axis, and the S3 axis correspond to Stokes parameters of polarization conditions, respectively, and are such values which have been standardized by Stokes parameter "S0" indicative of strengths.

Figure 10A:
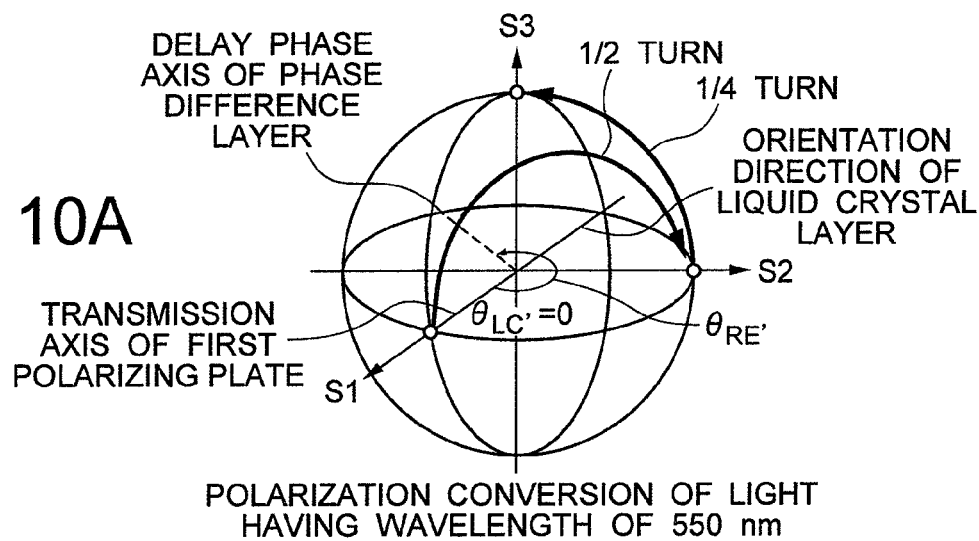
FIG. 10A to FIG. 10C are diagrams for indicating conversions of polarization conditions of incident light when a dark display is made by the phase difference layer and a liquid crystal layer of a reflection portion.

In the most case, a broadband quarter-wave plate is designed while such a light having a wavelength of 550 nm is employed as reference light at which a visual sensitivity becomes maximum. FIG. 10A shows a change in polarization conditions when the light having the wavelength of 550 nm passes through the broadband quarter-wave plate. Although the light which has passed through a polarizing plate is positioned at a point on the equator due to the linear polarization, when the light is entered to a half-wave plate, this incident light is rotated by a ½ turn around an axis equivalent to a slow axis thereof, and then, is moved to another point on the equator. Subsequently, when the light is entered to a quarter-wave plate, this incident light is rotated by a ¼ turn around an axis equivalent to a slow axis thereof, and then, is moved onto the North Pole so as to be converted into circularly polarized light.

Figure 10B:
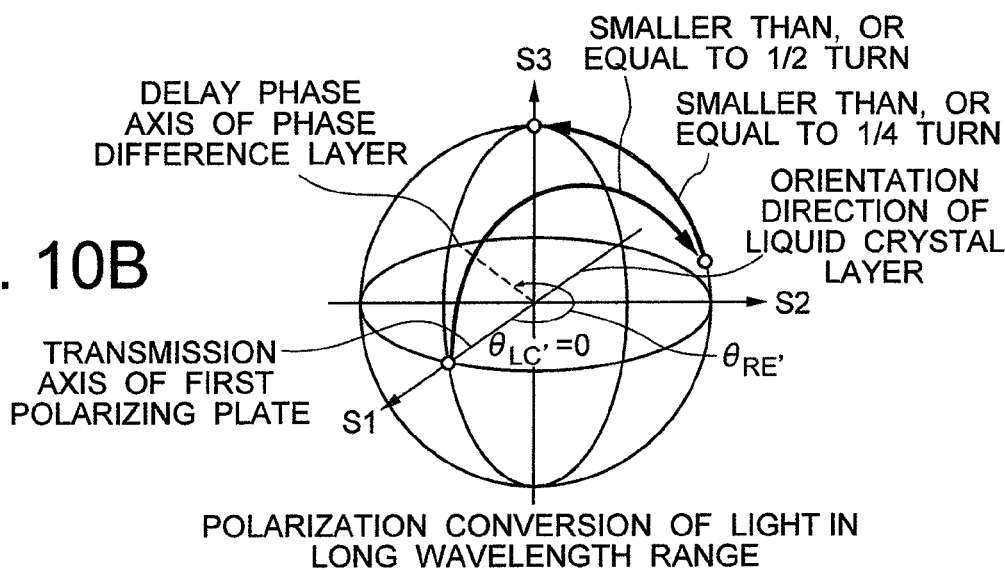
Figure 10C:
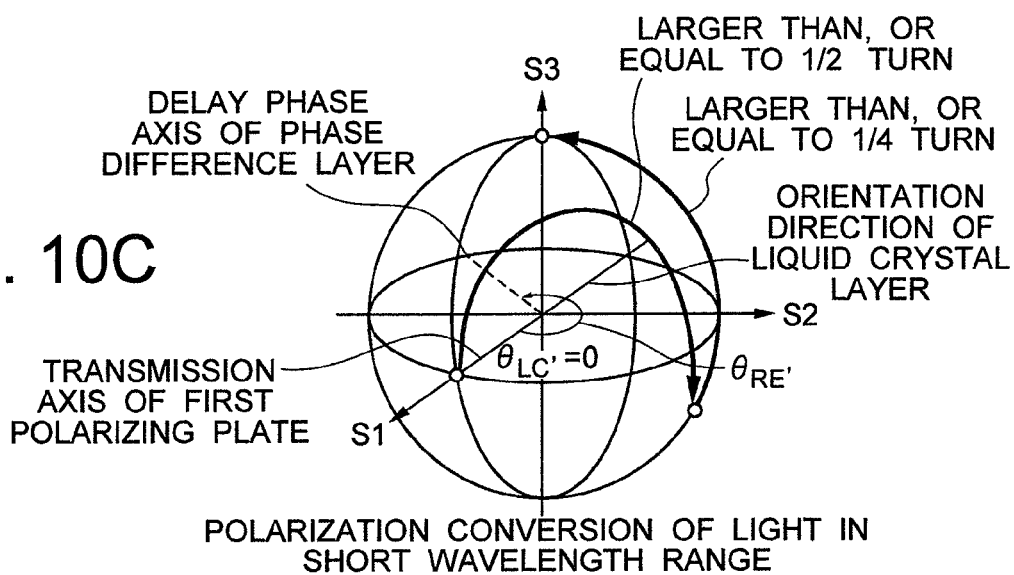

As seen from the most of optical anisotropic media in the natural world, a retardation value of a half-wave plate represents such a wavelength dependent characteristic which is decreased in a monotone in connection with a wavelength in a visible wavelength range. As a consequence, as indicated in FIG. 10B, on the side of a long wavelength of the visible wavelength range, a rotation becomes smaller than, or equal to a ½ rotation, the light does not reach the equator, but is moved on the Northern Hemisphere. As indicated in FIG. 10C, on the side of a short wavelength of the visible wavelength range, a rotation becomes larger than, or equal to the ½ rotation, the light passes through the equator, and then, is moved on the Southern Hemisphere. In the next quarter-wave plate, a move direction becomes a substantially reverse direction, and furthermore, a retardation value of the quarter-wave plate represents a wavelength dependent characteristic similar to that of the previously-explained half-wave plate.

As shown in FIG. 10B, on the side of the long wavelength of the visible wavelength, since the light is directed to the North Pole direction while a point on the Northern Hemisphere is a starting point, a distance up to the North Pole becomes closer. However, the rotation value at this time is smaller than, or equal to the ¼ turn, namely short, so that the light reaches a point in the vicinity of the North Pole. As shown in FIG. 10C, on the side of the short wavelength of the visible wavelength, since the light is directed to the North Pole direction while a point on the Southern Hemisphere is a starting point, a distance up to the North Pole becomes further. However, the rotation at this time is larger than, or equal to the ¼ turn, namely long, so that the light reaches the point in the vicinity of the North Pole.

As previously described, in the broadband quarter-wave plate, the light having any wavelengths of the visible wavelength range is moved to the points in the vicinity of the North Pole. This may be realized by stacking the half-wave plate on the quarter-wave plate, which have the wavelength dependent characteristics of the same retardation values, in such an angular relationship that the rotation directions of the light are substantially opposite to each other.

In the present invention, the liquid crystal layer of the reflection portion and the phase difference layer are stacked on each other in this order from the side close to the reflection layer. As a result, the liquid crystal layer of the reflection portion corresponds to the quarter-wave plate, whereas the phase difference layer corresponds to the half-wave plate. In other words, the retardation value as to the liquid crystal layer of the reflection portion may be set to be equivalent to the quarter-wave plate, whereas the retardation value as to the phase difference layer may be set to be equivalent to the half-wave plate.

Figure 11A:
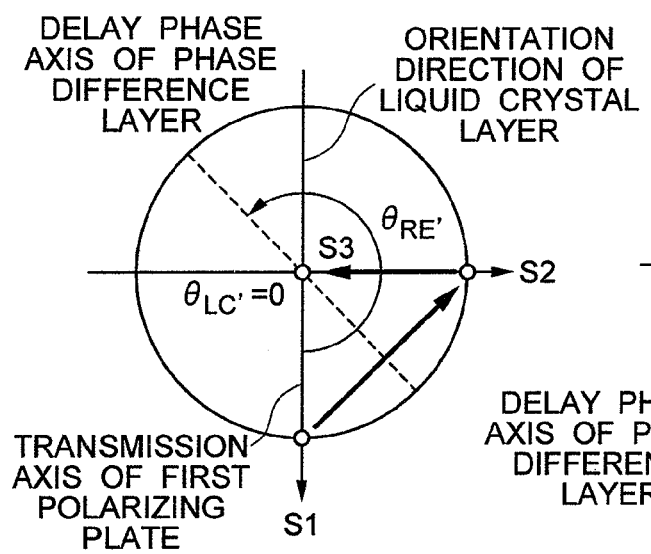
FIG. 11A to FIG. 11D are diagrams for indicating conversions of polarization conditions of incident light when a dark display is made by the phase difference layer and the liquid crystal layer of the reflection portion.

Although setting of angles of optical axes may also be conducted from FIG. 10A, FIG. 11A shows that the angle setting is projected to the S1 plane and the S2 plane. In this case, a center constitutes either the North Pole or the South Pole; and a circumference constitutes the equator.

Figure 11B:
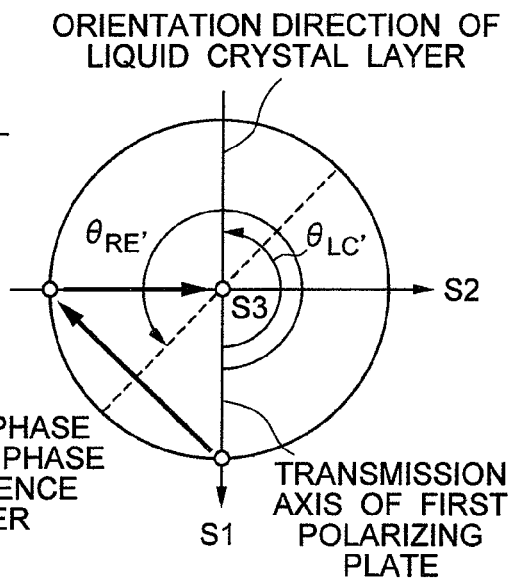
Figure 11C:
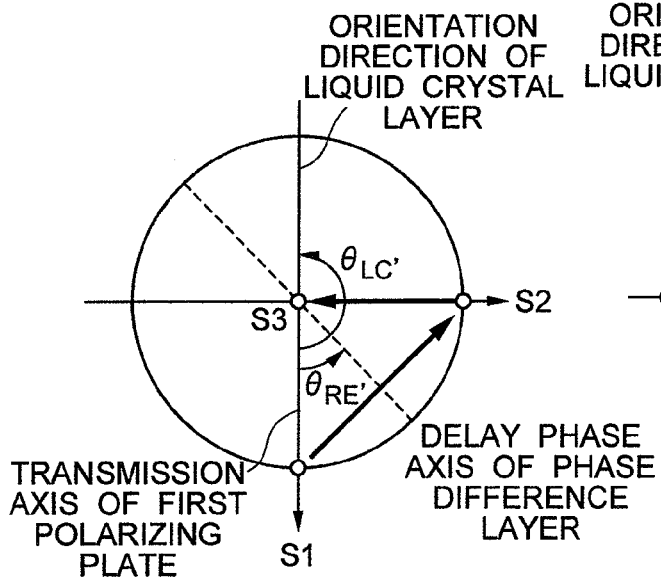
Figure 11D:
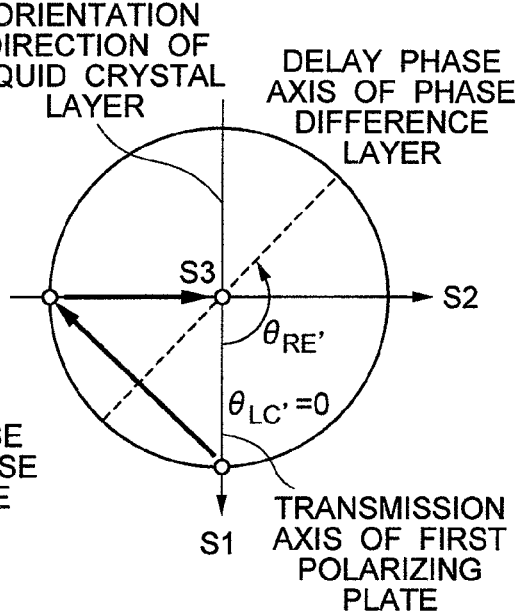

In FIG. 11A, a conversion of a polarization status is expressed as such a movement that light is moved over the Northern Hemisphere of the Poincaré sphere along the counter clockwise direction and then reaches the North Pole. In addition, as a broadband quarter-wave plate, there are: such a movement that the light is moved over the Northern Hemisphere of the Poincaré sphere along the clockwise direction and then reaches the North Pole; such a movement that the light is moved over the Southern Hemisphere of the Poincaré sphere along the counter clockwise direction and then reaches the South Pole; and also such a movement that the light is moved over the Southern Hemisphere of the Poincaré sphere along the clockwise direction and then reaches the South Pole, which are represented in FIG. 11B, FIG. 11C, and FIG. 11D, respectively.

When a slow axis azimuth angle "$\theta_{RE}$" of a phase difference layer and an orientation direction azimuth angle "$\theta_{LC}$" of a liquid crystal layer are defined respectively along the counter clockwise direction while a transmission axis azimuth angle of a first polarizing plate is defined as 0 degree, a relationship between these azimuth angles "$\theta_{RE}$" and "$\theta_{LC}$" is expressed by the below-mentioned formula (1) based upon FIG. 11A to FIG. 11D.

$$2\theta_{RE} = \pm 45° + \theta_{LC} \tag{1}$$

It should also be noted that symbols $\theta_{RE}'$ and $\theta_{LC}'$ shown in FIG. 11A to FIG. 11D establish the following relationships based upon the azimuth angles $\theta_{RE}$ and $\theta_{LC}$ of the above-described formula (1): $2\theta_{RE}' = \theta_{RE}$ and $2\theta_{LC}' = \theta_{LC}$, respectively. As previously explained, a large number of combinations between the azimuth angles $\theta_{RE}$ and $\theta_{LC}$ are present, and therefore, the angle combinations are not exclusively determined.

However, the present invention has the following purpose: That is, in a reflection display portion of a transflective type IPS liquid crystal display device, a similar effect to that of a broadband quarter-wave plate can be realized. As a result, there is a limitation in azimuth of an optical axis of a phase difference layer, and in that of a liquid crystal layer of a reflection portion. An orientation direction of the liquid crystal layer is similar to the orientation directions of the reflection display portion and of a transmission display portion. Since a first polarizing plate is adhered on the outer side of the first polarizing plate, transmission axis azimuth thereof is also similar to the axis azimuth of the reflection display portion and the transmission display portion. In order that the transmission display portion performs a black display when no voltage is applied thereto, the transmission axis azimuth of the first polarizing plate must be set parallel to, or perpendicular to the liquid crystal orientation. As a consequence, the orientation direction of the reflection portion liquid crystal layer becomes parallel, or perpendicular with respect to the transmission axis azimuth of the first polarizing plate.

In this case, since the orientation direction azimuth angle $\theta_{LC}$ is equal to 0 degree, or ±90 degrees, the slow axis azimuth angle $\theta_{RE}$ may be calculated as ±22.5 degrees, or ±67.5 degrees. Among these azimuth angles, since the latter-mentioned azimuth angle may give a lower reflectance than that of the former-mentioned azimuth angle, after all, the slow axis azimuth angle $\theta_{RE}$ is equal to ±67.5 degrees. Considering the above-described conditions, FIG. 10A to FIG. 10C and FIG. 11A to FIG. 11D illustrate such a condition that the orientation directions of the reflection portion liquid crystal layers have been set parallel, or perpendicular with respect to the transmission axis azimuth of the first polarizing plate.

In the combinations between the phase difference layers and the reflection portion liquid crystal layers, the reflectance of the reflection black display can be decreased in the largest degrees in accordance with the above-described manner.

Figure 12A:
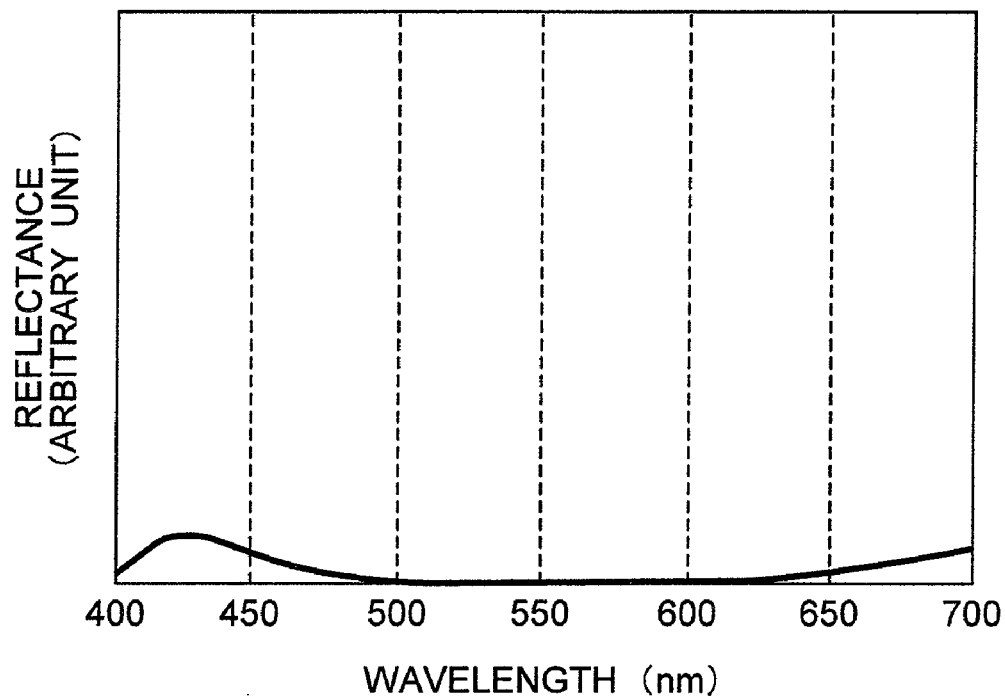
FIG. 12A and FIG. 12B are reflection spectral diagrams when the reflection display portion of the liquid crystal display device according to the embodiment 1 realizes a dark display.

As to a reflection spectrum, as indicated by a solid line in FIG. 12A, a reflectance is decreased over a wide visible wavelength range while a wavelength of 550 nm is set as a center thereof. Although a hue of the above-described reflection spectrum corresponds to a dark purple, if the reflection spectrum is observed, then it can been seen as black of a neutral color. However, at this time, the retardation value of the reflection portion liquid crystal layer becomes 137 nm, and even if such a liquid crystal material whose birefringence is nearly equal to the present minimum value (nearly equal to 0.07) is employed, then the thickness of the liquid crystal layer must be selected to be approximately 2 μm.

In an IPS type liquid crystal display device, if a thickness of a liquid crystal layer is thin, as previously explained, then orientation control force formed by first and second orientation films is strongly exerted, so that deformations of liquid crystal orientations are suppressed to a small value when a voltage is applied to the IPS type liquid crystal display device. As a result, there is such a problem that a sufficiently large light display reflectance cannot be obtained.

After a ratio of retardation values between the phase difference layer and the reflection portion liquid crystal layer is maintained, if the retardation value of the reflection portion liquid crystal layer is increased, then the polarization conversions shown in FIG. 10A to FIG. 10C can be established in a quasi-manner. That is, also, as to such a light having a wavelength of 550 nm where a visual sensitivity becomes maximum, as represented in FIG. 10C, the light reaches the point in the vicinity of the North Pole of the Poincaré sphere by the polarization conversion. As a consequence, while the dark display reflectance is kept at a relatively low reflectance, the retardation value of the reflection portion liquid crystal layer can be increased. If the thickness of the reflection portion liquid crystal layer is increased, then the influence by the orientation control force is also reduced, and the light display reflectance is increased based upon a mutual effect achieved by the reduction of the orientation control force and the increase of the retardation value of the reflection portion liquid crystal layer. However, at this time, since the dark display reflectance is increased larger than the light display reflectance, a reflection contrast ratio is decreased.

Figure 12B:
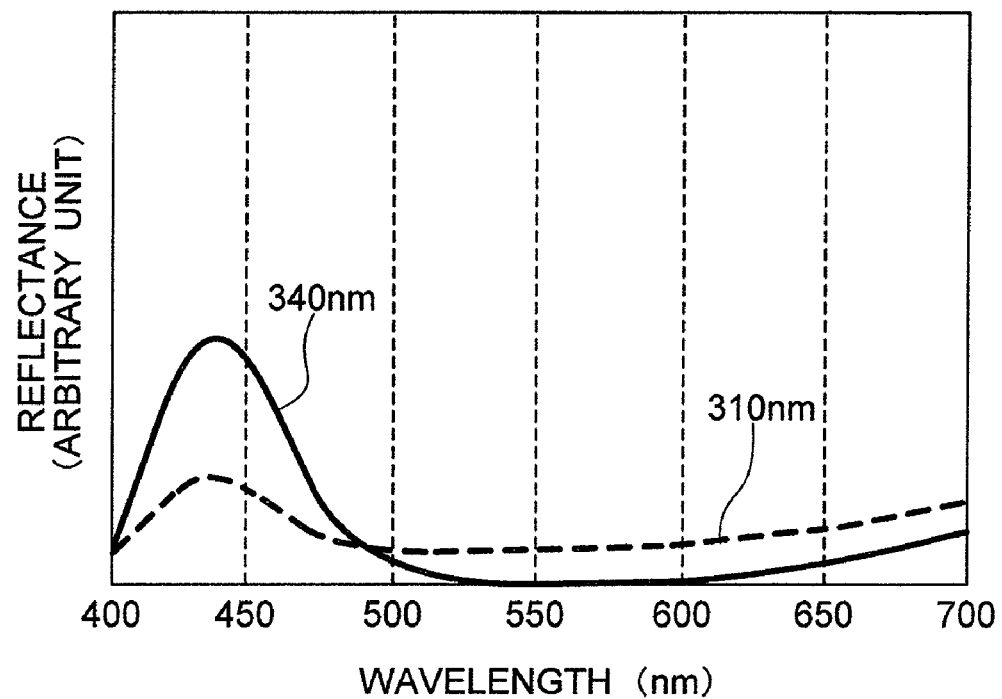

In FIG. 12B, a reflection spectrum along a normal direction is indicated by a solid line when the retardation value of the phase difference value is 340 nm and the retardation value of the reflection portion liquid crystal layer is 170 nm. Although a reflectance in a long wavelength range may be suppressed to a relatively low value, it can be seen that a reflectance especially in a short wavelength range is largely increased. In this case, a reflection dark display is colored in blue for observation.

The actual pixels have been color-divided by the red color filter, the green color filter, and the blue color filter. Since reflections of the light having the short wavelength range within the visible wavelengths are caused by the blue pixels, namely are large, there are many large reflections from the blue pixels. Accordingly, the following solution may be conceived: That is, the retardation values of the phase difference layers equivalent to the blue pixels are partially changed so as to reduce the light reflections caused from the blue pixels.

FIG. 12B indicates a change in a dark display reflection spectrum by a broken line when the retardation value of the phase difference layer is changed while the retardation value of the reflection portion liquid crystal layer is fixed to 170 nm. While an attention is paid to a reflectance of a short wavelength range, when the retardation value of the phase difference layer is decreased from 340 nm to 310 nm, it can be understood that this reflectance is decreased. For instance, assuming now that the retardation value of the phase difference layer corresponding to the blue pixel is 310 nm, a peak value of the light reflection in the short wavelength range becomes smaller than, or equal to a half peak value in the case that the retardation value of the phase difference layer is 340 nm. When an attention is paid to other wavelength ranges than the short wavelength range, although a reflectance is increased as compared with the reflectance in the case of 340 nm, as to the blue pixel, the transmittance of the light other than the short wavelength range is low, so that an influence caused by the increase of the reflectance can be hardly represented. Similarly, as to the green pixel and the red pixel, although the retardation values of the phase difference layers are selected to be 340 nm, since the transmittances of the light in the short wavelength range are low, even when the reflectances in the short wavelength range are high, influences caused by the increases in the reflectances can be hardly represented.

In order to realize this condition, a photomask employed in light irradiation operation is changed. Since the photomask is realized as either a half tone mask or a gray scale mask, a light irradiation amount of such a portion corresponding to the phase difference layer related to the blue pixel is decreased. The half tone mask reduces an average light irradiation amount by a very fine drawing smaller than, or equal to a resolution limit, while as the very fine drawing smaller than, or equal to the resolution limit, for example, there are a very fine stripe-shaped pattern, and the like. The gray scale mask reduces the light irradiation amount by a semi-transparent portion. If the light irradiation amount of the phase difference layer corresponding to the blue pixel is lowered, then lowering of the retardation value only for the blue pixel due to the thermal relaxation may unnecessarily occur; a lowering amount of retardation values caused by the subsequent heating process becomes larger than those of the green and red pixels; and thus, the retardation value thereof becomes lower than those of the phase difference layers corresponding to the green pixel and the red pixel.

More generally speaking, in such a case that a light reflection is increased on one side of a visible light range, if color filters are classified into a short wavelength color filter and a long wavelength color filter, any one of these color filters is adapted to such a wavelength range that light reflections are increased, and retardation values of phase difference layers corresponding to these color filters are optimized, then a dark display reflectance may be furthermore reduced. In this embodiment 1, the following filter classification is equivalently performed: That is, the blue color filter is classified as the short wavelength color filter, whereas both the green color filter and the red color filter are classified as the long wavelength color filter.

While an integrating sphere light source was arranged on an upper plane of the liquid crystal display device according to the present invention by separating this integrating sphere light source by such a distance equal to a radius of an opening portion thereof, a contrast ratio of a reflection display thereof was measured. Although there are many possibilities that while light entered from a direction inclined with respect to the normal direction is utilized as a light source in a reflection type display, a display device itself is observed along the normal direction, such a reflection display characteristic capable of reflecting an actual use condition can be evaluated based upon this method. The measured contrast ratio was approximately 1.4 times higher than that obtained in the case that all of the retardation values of the phase difference layers are made equal to each other in the red, green, blue pixels. As previously described, in accordance with the present invention, the contrast ratio of the reflection display in the transflective type IPS liquid crystal display device could be improved without increasing the manufacturing process steps.

Embodiment 2

If the retardation value of the phase difference layer is increased larger than 340 nm and the retardation value of the reflection portion liquid crystal layer is also increased in connection thereto in such a manner that this retardation value is kept as approximately ½ with respect to the retardation value of the phase difference layer, then a higher reflectance of a light display can be obtained. In other words, the thickness of the reflection portion liquid crystal layer can be increased, so that the influence caused by the orientation control force is reduced, and thus, the orientation of the liquid crystal layer can be readily changed when a voltage is applied. Also, since the retardation value of the liquid crystal layer is increased, a change in an optical characteristic when the orientation is changed is increased. However, at this time, a dark display reflection spectrum in the short wavelength range is further increased, so that a reflection contrast ratio is largely decreased. As a result, a sufficiently large reflectance of the light display could not be achieved.

In accordance with a transflective type IPS liquid crystal display device of an embodiment 2 of the present invention, while retardation values of phase difference layers corresponding to the red pixel and the green pixel were set to 370 nm, a retardation value of a reflection portion liquid crystal layer was increased to become 180 nm.

Figure 13:
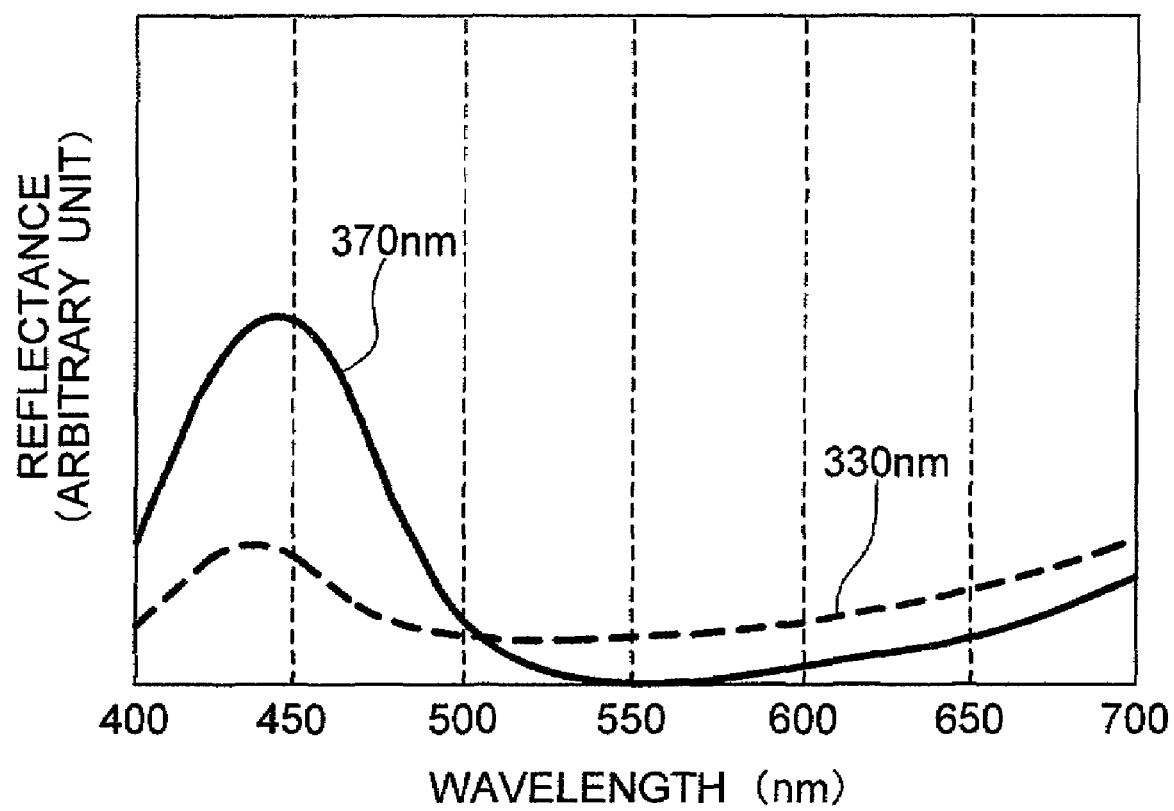
FIG. 13 is a reflection spectral diagram when the reflection display portion of a liquid crystal display device according to an embodiment 2 of the present invention realizes a dark display.

At this time, a reflection spectrum is indicated by a solid line in FIG. 13. In a maximum visual sensitivity of 550 nm, a reflectance is lowered. However, a reflectance of the short wavelength range is increased, as compared with that of FIG. 12B indicated by the solid line. FIG. 13 indicates a reflection spectrum by a broken line when the retardation value of the phase difference layer is set to 330 nm while the retardation value of the reflection portion liquid crystal layer is kept as 180 nm. In comparison with the reflection spectrum of the solid line, the reflection spectrum of the broken line indicates that the reflectance of the short wavelength range is furthermore reduced. As a result, in the present embodiment 2, the retardation value of the phase difference layer corresponding to the blue pixel was set to 330 nm. As a consequence, although the contrast ratio was lowered, the higher reflectance of the light display can be obtained, as compared with that of the above-described embodiment 1.

Embodiment 3

In the above-described embodiment 1, while the slow axis azimuth angle $\theta_{RE}=\pm 67.5$ degrees, the same dark display reflectance is given at any angles, but the light display reflectances are different from each other. With respect to each of the angles, if a relationship among liquid crystal orientation azimuth, slow axis azimuth of a phase difference layer, and a slit direction is illustrated, then 4 different sorts of these relationships are given in FIG. 14A to FIG. 14D.

Figure 14A:
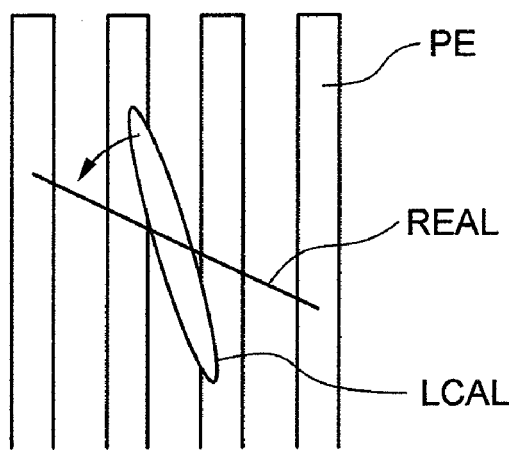
FIG. 14A to FIG. 14D are plane views for indicating a mutual relationship among a phase difference layer, a pixel electrode, and an azimuth angle along a liquid crystal orientation direction.
Figure 14B:
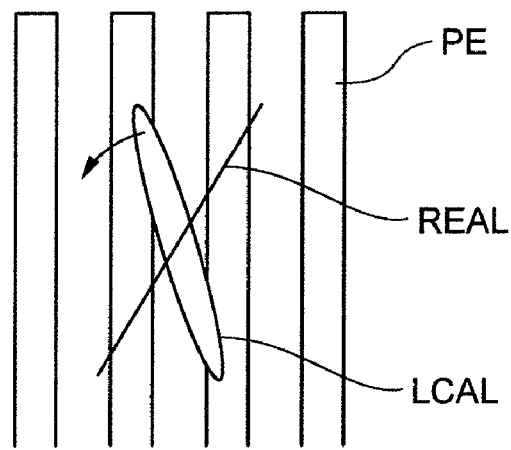
Figure 14C:
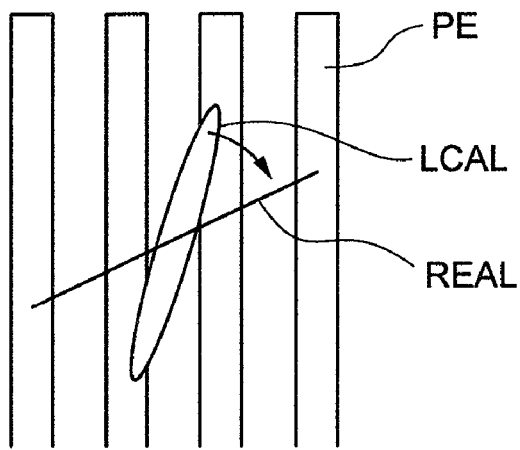
Figure 14D:
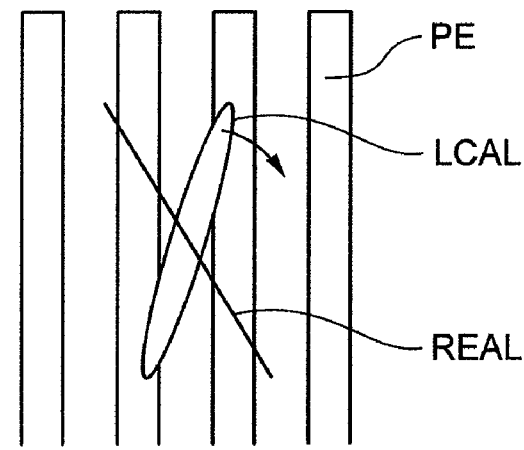

FIG. 14A to FIG. 14D are plane views of the mutual relationships as observed along a normal direction of a substrate. FIG. 14A and FIG. 14B show such a mutual relationship in the case that the liquid crystal direction "LCAL" is 15 degrees along the counter clockwise direction with respect to the slit direction of the pixel electrode "PE"; and FIG. 14C and FIG. 14D show such a mutual relationship in the case that the liquid crystal direction "LCAL" is 15 degrees along the clockwise direction with respect to the slit direction of the pixel electrode "PE." Also, FIG. 14A and FIG. 14D indicate such a mutual relationship when the slow axis azimuth angle $\theta_{RE}=+67.5$ degrees, and FIG. 14B and FIG. 14C indicate such a mutual relationship when the slow axis azimuth angle $\theta_{RE}=-67.5$ degrees. In FIG. 14B and FIG. 14D, the slit direction is present within the angle of 67.5 degrees which defines the liquid crystal orientation direction "LCAL" and the phase difference layer slow axis "REAL", whereas in FIG. 14a and FIG. 14C, the slit direction is present outside this angle.

Figure 15:
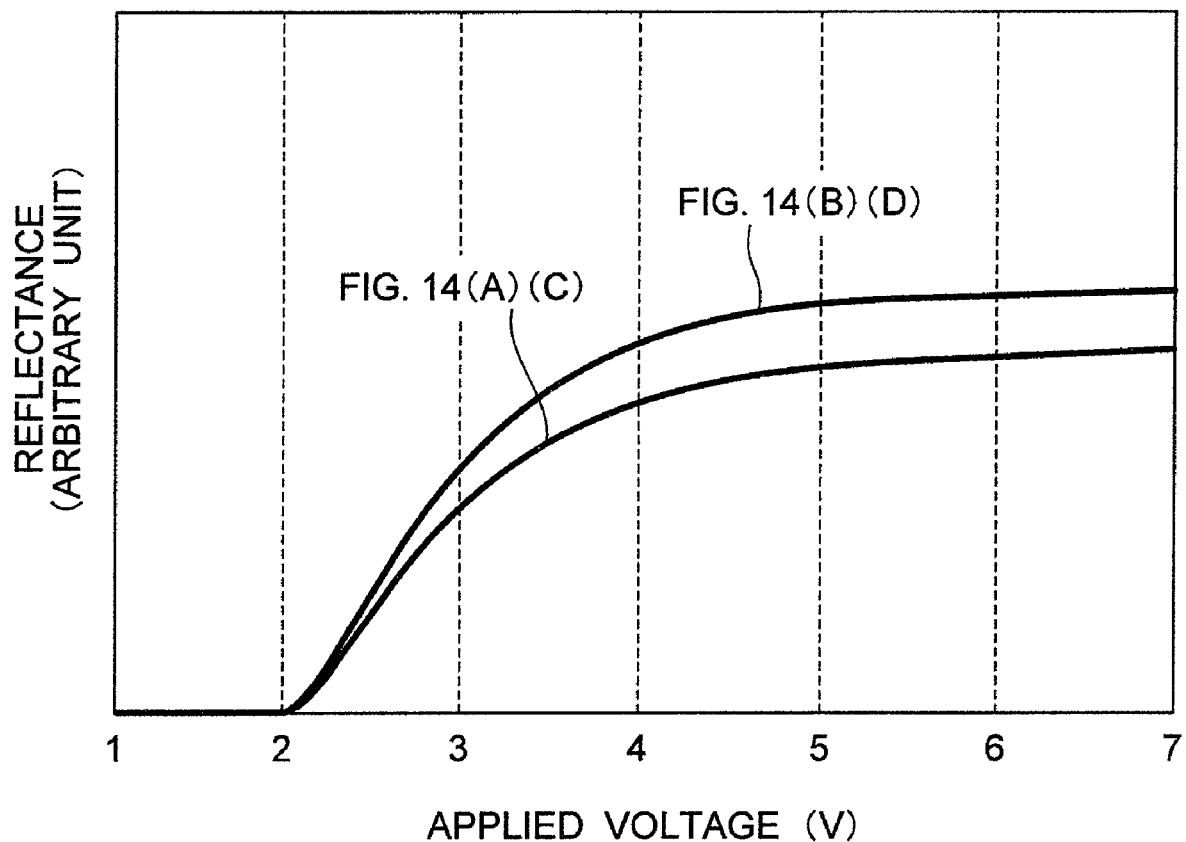
FIG. 15 is a diagram for indicating a driving voltage dependent characteristic of a reflectance in a liquid crystal display device according to an embodiment 3 of the present invention.

When applied voltage dependent characteristics of reflectances when voltages are applied are acquired with respect to these aspects, as shown in FIG. 15, as to the arrangements of FIG. 14B and FIG. 14D, higher reflectances can be obtained during the voltage applying operations with respect to the arrangements of FIG. 14A and FIG. 14C. This reason is given, depending upon orientation statuses when the voltages are applied. It is known in this technical field that such an uniaxial orientation model for changing only an azimuth angle thereof while a liquid crystal layer maintains an uniaxial orientation when a voltage is applied can describe behavior of an IPS liquid crystal display device in an approximation manner.

While the above-described approximate description is adapted, the changes in the liquid crystal orientations when the voltages are applied are illustrated by arrows in FIG. 14A to FIG. 14D. In FIG. 14B and FIG. 14D, when the voltages are applied, the liquid crystal orientations are changed in such a manner that the liquid crystal orientations are separated far from the delay phase axial direction of the phase difference layer, whereas in FIG. 14A and FIG. 14C, when the voltages are applied, the liquid crystal orientations are changed in such a manner that the liquid crystal orientations are moved close to the delay phase axial direction of the phase difference layer. As previously described, since the mutual relationships of the orientation directions defined by the phase difference layers and the liquid crystal layers when the voltages are applied are different from each other, the reflectances when the voltages are applied are different from each other. In order to obtain a high reflectance when the light display is made, as indicated in FIG. 14B and FIG. 14D, it is more preferable to employ such arrangements that the slit directions are present within the angle of 67.5 degrees which defines the liquid crystal orientation direction and the phase difference layer slow axis.

Embodiment 4

In the embodiment 1, the color filters have been constructed of the three different color filters (red, green, and blue color filters). In an embodiment 4, these three color filters are replaced by 4 color filters, namely, red, green, blue, and cyan color filters. Accordingly, the embodiment 4 has such a merit that a wider color reproducible range can be obtained, as compared with that of the three color filters (red, green, and blue color filters). In particular, the embodiment 4 can reproduce sharp cyan and yellow colors, which could not be reproduced by employing these three color (red, green, blue) filters.

When the respective 4 color filters are described in the order of wavelengths capable of giving maximal transmittances, the blue, cyan, green, and red color filters are given from the short wavelength side. In this case, both the blue and cyan color filters were classified as short wavelength color filters, whereas the green and red color filters were classified as long wavelength color filters. The retardation values of the phase difference layers corresponding to the blue and cyan pixels were set to 310 nm, whereas the retardation values of the phase difference layers corresponding to the green and red pixels were set to 340 nm. Also, in this case, a higher contrast ratio of the reflection display could be achieved, as compared with that of such a case that the retardation values of the phase difference layers were set to the constant values.

Embodiment 5

In the above-described embodiment 1, since the light irradiation amount has been changed when the optical polymerization was performed, the flat plane distribution has been formed in the retardation value of the phase difference layer. In other words, although this may be equivalent to such a case that the flat plane distribution has been formed in "Δn" of the phase difference layer, in accordance with an embodiment 5, this may be realized by a method different from the above-described method.

Figure 16:
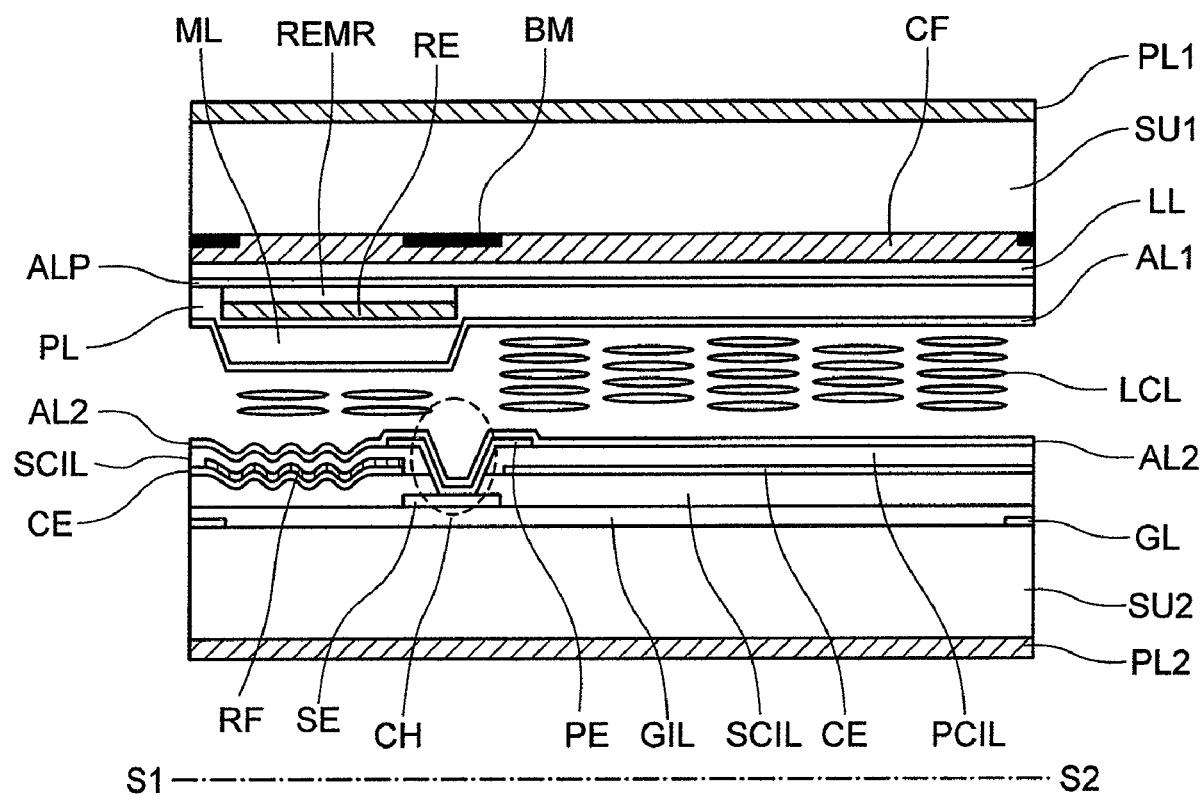
FIG. 16 is a sectional view for indicating 1 pixel of a liquid crystal display device according to an embodiment 5 of the present invention.

FIG. 16 shows a sectional plane of a liquid crystal display device according to the present embodiment 5. FIG. 16 is a sectional plane of a blue pixel instead of the green pixel, and the blue pixel has a similar structure to the sectional plane of the green pixel indicated in FIG. 1. The liquid crystal display device contains a film thickness difference forming layer "REMR" on the side close to the first substrate SU1, as compared with the phase difference layer RE.

Figure 17A:
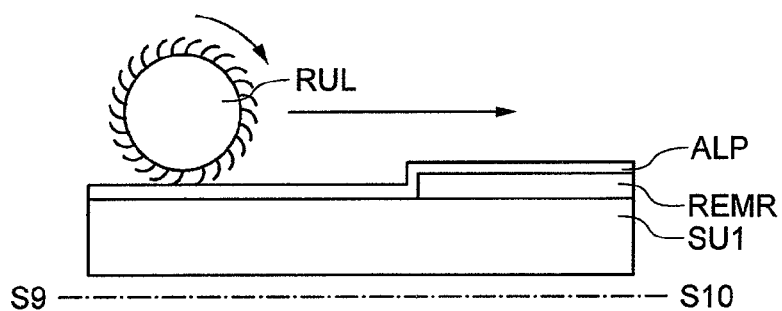
FIG. 17A to FIG. 17E are diagrams for indicating a process for forming a phase difference layer of the embodiment 5.
Figure 17B:
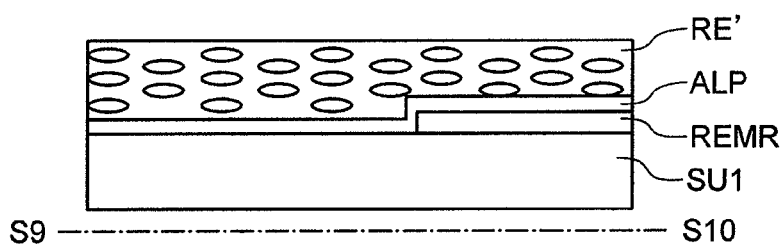
Figure 17C:
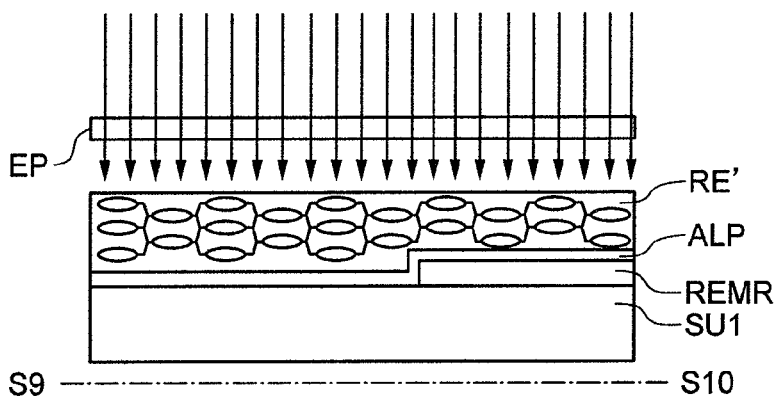
Figure 17D:
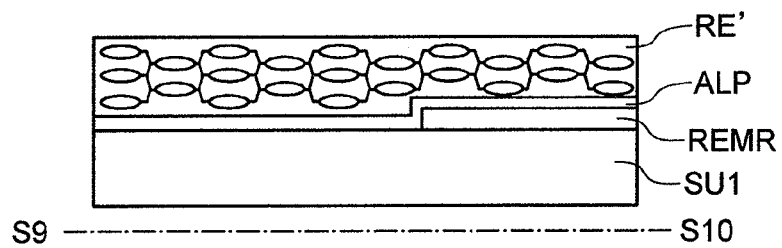
Figure 17E:
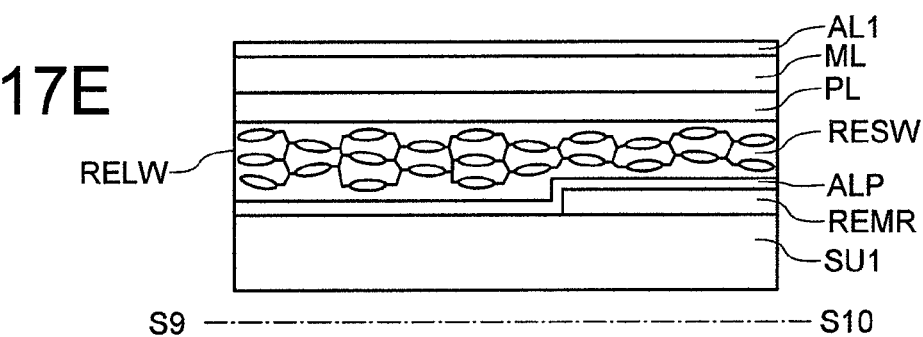
Figure 18:
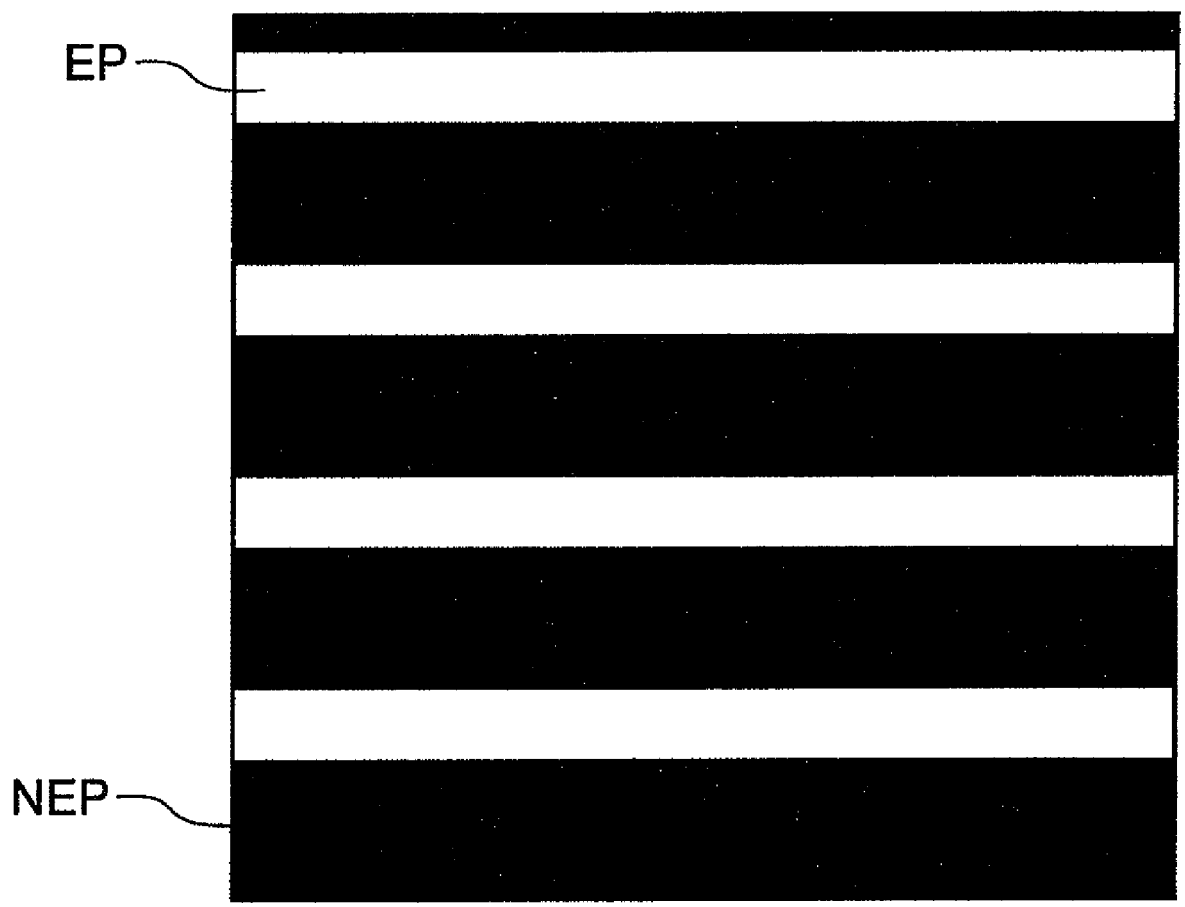
FIG. 18 is a plane view for indicating a photomask which is employed in a patterning operation of the phase difference layer of the embodiment 5.

FIG. 17A to FIG. 17E show a forming process for forming a phase difference layer of this embodiment 5. As indicated in FIG. 17A, a film thickness difference forming layer "REMR" is arranged only on a portion corresponding to a blue pixel. When a solution of optical polymerization liquid crystal molecules is coated on the film thickness difference forming layer REMR under liquid crystal phase condition, as shown in FIG. 17B, a thickness of the layer becomes thin on the film thickness difference forming layer REMR due to fluidability thereof. Under this condition, as shown in FIG. 17C, when light is irradiated onto this layer at the same irradiation amounts of the respective 4 colors so as to solidify the irradiated layer, such a phase difference layer RE' that a thickness of this layer only for the blue color is made thin is formed. FIG. 18 shows a photomask which is employed during exposing operation, while a transmittance of an exposing portion EP is constant which is different from that of FIG. 8. In the subsequent heating process, as shown in FIG. 17E, orientations are equally distributed at any portions, so that a difference of "Δn" does not appear. A difference of the retardation values is determined based upon a difference in the film thicknesses shown in FIG. 17B.

In this embodiment 5, similar to the above-described embodiment 1, the retardation value only for the phase difference layer corresponding to the blue pixel is decreased, so that the effect capable of improving the reflection contrast ratio can be achieved.

Embodiment 6

In an embodiment 6 of the present invention, a calculation was made of combinations of retardation values as to phase difference layers and reflection portion liquid crystal layers, which reduce a dark display reflectance. While axial angles of a first polarizing plate, the phase difference layer, and the reflection portion liquid crystal layer were set, it is so assumed that any of an optical path when light is entered, and another optical path when light is reflected was directed to the normal direction.

Since commercially available one-dimensional calculation software capable of executing optical calculations based upon the Jones matrix method was employed, dark display reflectances were calculated while the combinations of the retardation values for the phase difference layers and the reflection portion liquid crystal layers were changed. A calculation result is indicated in FIG. 19A.

Figure 19A:
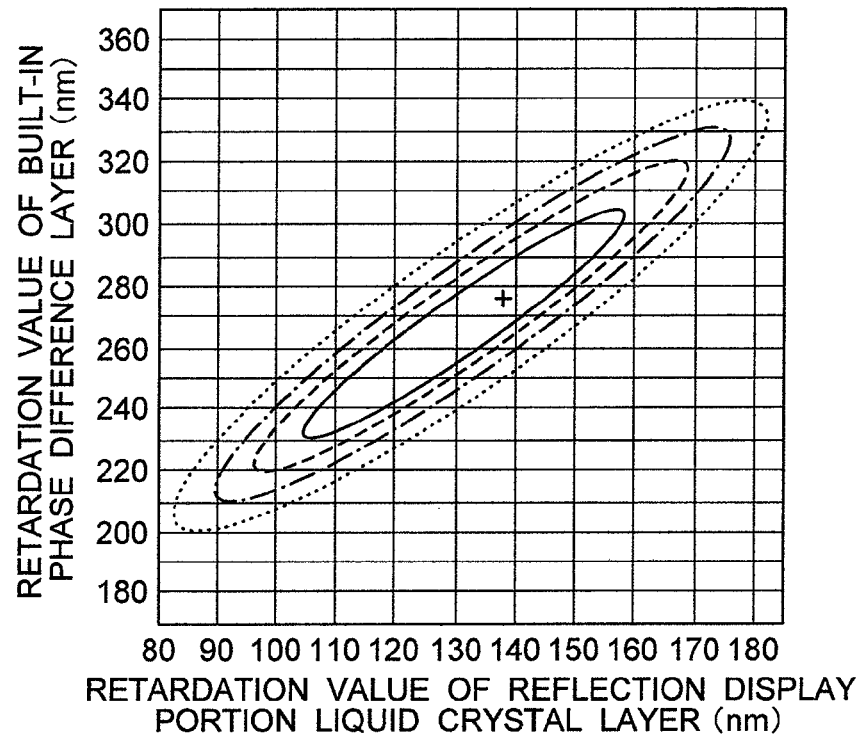
FIG. 19A to FIG. 19B indicate retardation relationship diagrams between the phase difference layers for lowering reflectances of dark displays and liquid crystal layers of reflection portions.

In FIG. 19A, symbol "+" indicates such a case that a retardation value of the phase difference layer and a retardation value of the reflection portion liquid crystal layer in the wavelength of 550 nm are set to values of an ideal broadband quarter-wave plate, namely, the former-mentioned retardation value is set to 275 nm, and the latter-mentioned retardation value is set to 137.5 nm; and an area indicated by a solid line corresponds to such an area that a dark display reflectance 1.5 times smaller than, or equal to the value at this time is obtained. Other areas outside the above-described area, which are indicated by a broken line, a dot and dash line, and a dot line, correspond to areas where such dark display reflectances can be obtained which are 2.0 times, 2.5 times, and 3.0 times larger than the dark display reflectance of the ideal broadband quarter-wave plate. As described above, the areas where the superior dark display reflectances can be obtained are distributed in a substantially ellipsoidal shape, while the symbol "+" is located as a center. Also, these areas are ellipses whose long axes are inclined, and the inclinations thereof are positive. FIG. 19A represents such a fact that if a direct proportional relationship can be established in the retardation values of the phase difference layers and the reflection portion liquid crystal layers, then the dark display reflectances can be reduced.

Figure 19B:
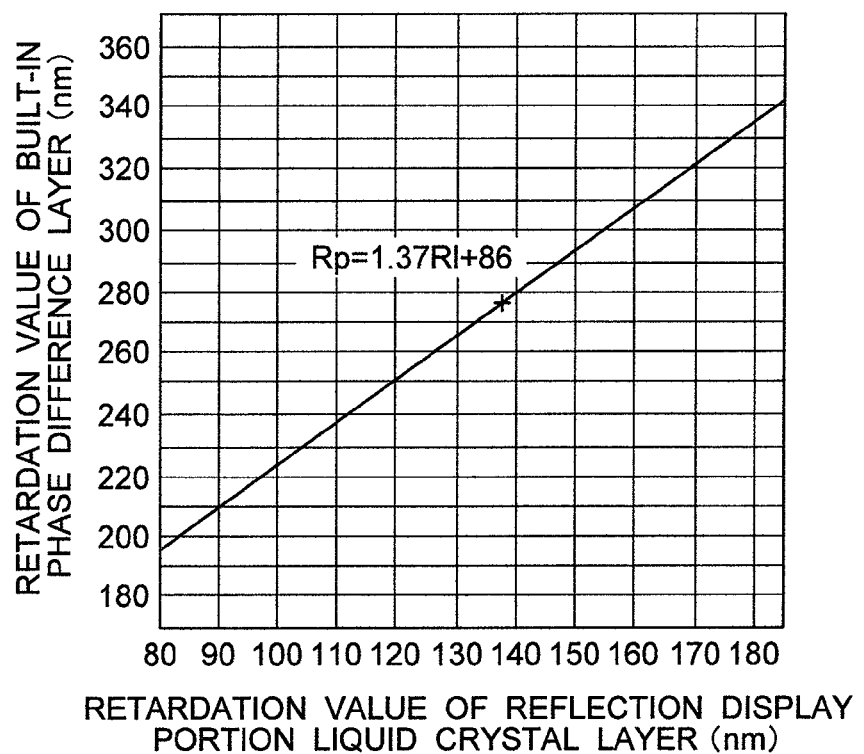

A straight line corresponding to the long axis of this ellipse is derived based upon the above-explained manner, and a relative formula thereof is obtained, which is illustrated in FIG. 19B. Assuming now that the retardation value of the phase difference value is "Rp", and the retardation value of the liquid crystal layer of the reflection display unit is "Rl", if these retardation values Rp and Rl have such a relationship of Rp=1.37Rl+86, or are positions close to it, then a relatively better dark display reflectance can be obtained even when the retardation values of both the layers are shifted from the value of the ideal quarter-wave plate.

The above-described ideas can be explained in a qualitative manner by employing FIG. 10B and FIG. 10C. That is to say, in the case that the retardation value of the phase difference layer is smaller than the ideal value, if the retardation value of the reflection portion liquid crystal layer is similarly smaller than the ideal value, then the light can be moved to the place near the pole of the Poincaré sphere, and the dark display reflectance can be reduced. Conversely, in the case that the retardation value of the phase difference layer is larger than the ideal value, if the retardation value of the reflection portion liquid crystal layer is similarly larger than the ideal value, then the light can be moved to the place near the pole of the Poincaré sphere.

The above-described result may become advantage in order to determine the retardation value of the phase difference layer when the retardation value of the reflection display portion liquid crystal layer is set to be larger than the value of the ideal quarter-wave plate, while the reflection has a top priority.

Embodiment 7

Since a reflection layer "RF" diffuses and reflects incident light, the reflection layer "RF" has a property for reflecting light along the normal direction, which is entered to a liquid crystal device from an oblique direction. As a consequence, when the liquid crystal display device is also observed from the normal direction, the light entered to the liquid crystal display device along the oblique direction is observed. Accordingly, in order to achieve a high grade reflection display, an attention should be paid also to a visual angle characteristic of a reflection display portion. More specifically, in order to improve a reflection contact ratio by reducing a reflection dark display, the visual angle characteristic of the reflection dark display must be improved. In an embodiment 7 of the present invention, the reflection contrast ratio has been improved by improving the visual angle characteristic of the reflection dark display.

In order to improve the visual angle characteristic of the reflection dark display, for example, a first idea may be conceived. That is, an optical film capable of compensating the visual angle characteristic is newly added between the first substrate and the first polarizing plate. However, in this idea, the thickness of the liquid crystal display device is increased. Also, such optical films are positioned not only on the reflection display portion, but also on the upper plane of the transmission display portion. As a result, the optical films may also give an influence to a visual angle characteristic of a transmission display, and must establish compatibility between the visual angle characteristic of the reflection dark display and the visual angle characteristic of the transmission display.

Figure 20A:
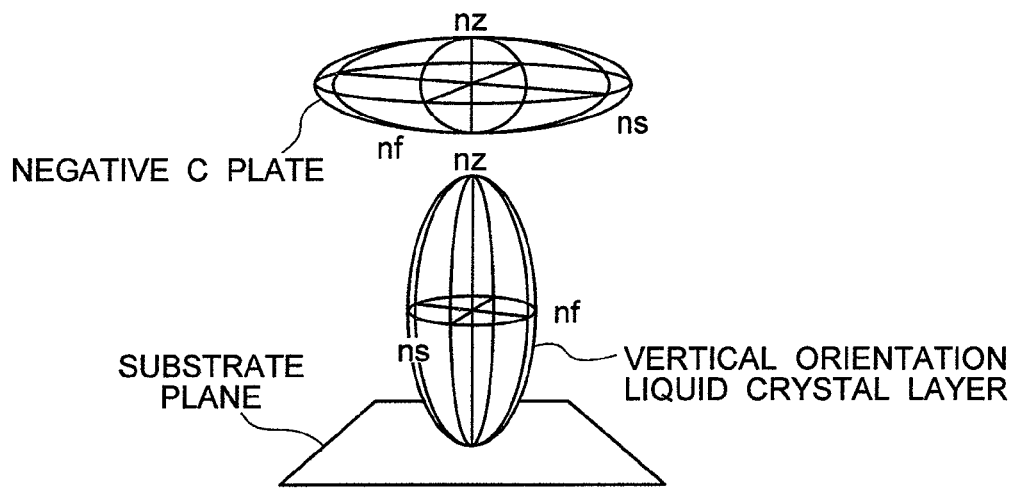
FIG. 20A to FIG. 20C are diagrams for showing a combination between various sorts of liquid crystal layers and optical indicatrix of phase difference layers.

As a consequence, the optical characteristic has been changed by changing a material of a phase difference layer. In order to improve the visual angle characteristic, a refractive index distribution of a substrate plane direction must be balanced with respect to a refractive index distribution of a substrate normal direction. FIG. 20A indicates such an example that the visual angle characteristic could be improved by that the refractive index distribution of the substrate plane direction is balanced with respect to the refractive index distribution of the substrate normal direction. FIG. 20A corresponds to an example of vertical orientation type liquid crystal, and indicates both a vertical orientation liquid crystal layer corresponding to an optical anisotropic medium for constructing this vertical orientation type liquid crystal, and a refractive index ellipsoid of a negative C plate. In the vertical orientation type liquid crystal, when a dark display is performed, nematic liquid crystal has been orientated along the substrate normal direction; the refractive index ellipsoid indicative of a refractive index distribution thereof is a rugby ball shape; and furthermore, a long axis of this refractive index ellipsoid has been directed to the substrate normal direction. In order to compensate this visual angle characteristic, the negative C plate has been employed; a refractive index ellipsoid thereof is a convex lens shape; and a rotation symmetrical axis thereof has been directed to the substrate normal direction. In the refractive index distribution of the vertical orientation liquid crystal layer, the substrate normal line direction is an excess, whereas in the refractive index distribution of the negative C plate, the substrate plane direction is an excess, so that since both cases are combined with each other, the refractive index distributions can be balanced with each other.

As indexes indicative of the refractive index distributions along the substrate plane direction and the substrate normal direction, there is an Nz coefficient. This Nz coefficient is expressed by the below-mentioned equation (2), as described in "SID91DIGEST" written by Yasuo Fujimura, Tatsuki Nagatsuka, Hiroyuki Yoshimi, and Takefumi Shimomura, on pages 739 to 742:

$$Nz=(ns-nz)/(ns-nf) \qquad (2)$$

In this equation (2), symbols "ns" and "nf" represent a refractive index of a slow axis direction, and a refractive index of a lead phase axis direction within the substrate plane; and symbol "nz" shows a refractive index of a substrate normal direction. While the optical anistropic media which constitute the reflection display portion are the reflection display portion liquid crystal layer and the phase difference layer, respectively, the former medium corresponds to nematic liquid crystal, and the latter medium also corresponds to such a liquid crystal which is formed by optically polymerizing nematic liquid crystal having an optical reactive characteristic. As a consequence, a refractive index of the orientation direction is large, whereas a refractive index of the vertical direction thereof is small. Since the orientation direction is located within the substrate plane, the refractive indexes "ns", "nf", "nz" of the reflection display portion liquid crystal layer and the phase difference layer are defined based upon a relationship of the following formula (3):

$$ns>nf=nz \qquad (3)$$

Figure 20B:
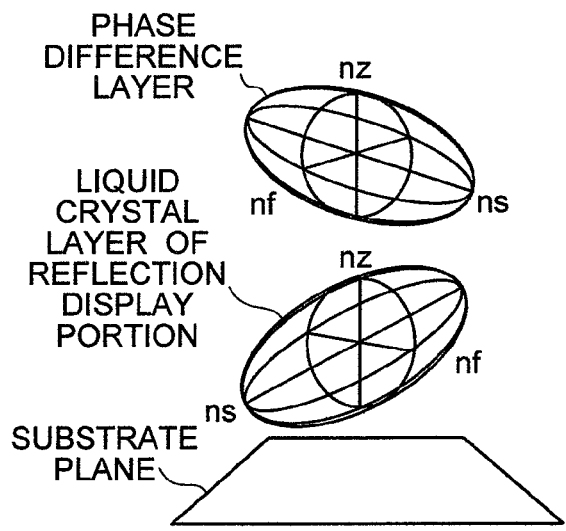

The Nz coefficient is 1. At this time, as represented in FIG. 20B, refractive index ellipsoids of both the reflection display portion liquid crystal layer and the phase difference layer are rugby ball shapes, respectively, and rotation symmetrical axes of these refractive index ellipsoids are located parallel to the substrate plane direction. The refractive index of the substrate normal direction is smaller than that of the substrate plane direction, and therefore, it can be understood that the refractive index along the substrate normal direction is not balanced with the refractive index along the substrate plane direction. In order to improve the visual angle characteristic, with respect to any one of the reflection display portion liquid crystal layer and the phase difference layer, the refractive index along the substrate normal direction must be increased. Within these layers, the liquid crystal layer must be the nematic phase in order to be operated as the liquid crystal display device, so that the refractive index of the liquid crystal layer cannot be changed.

Although the refractive index of the phase difference layer along the substrate normal direction, at this time, in order that the function as the phase difference layer is maintained, the retardation value thereof along the substrate normal direction must be maintained. Alternatively, discotic liquid crystal may be employed in addition to the above-described nematic liquid crystal in the phase difference layer. A detailed explanation as to this discotic liquid crystal is made in "physics of liquid crystal by Chandrasekhar" written by Chandrasekhar, translated by Hatsuo Kimula and Yuzuru Yamashita. While a rigid skeleton portion of liquid crystal molecules is referred to as mesogen, there are such features that mesogen of the nematic liquid crystal has a rod shape, whereas mesogen of the discotic liquid crystal has a disk shape. If the discotic liquid crystal is orientated in such a manner that the disk-shaped mesogen is located perpendicular to the substrate plane, then refractive index anisotropy is produced when being viewed from the normal direction. As a result, while the function as the phase difference layer is maintained, the refractive index along the substrate normal direction can be increased. At this time, the refractive indexes "ns", "nf", "nz" of the phase difference layers are defined based upon a relationship of the following formula (4), while the Nz coefficient becomes 1:

$$ns = nz > nf \tag{4}$$

Figure 20C:
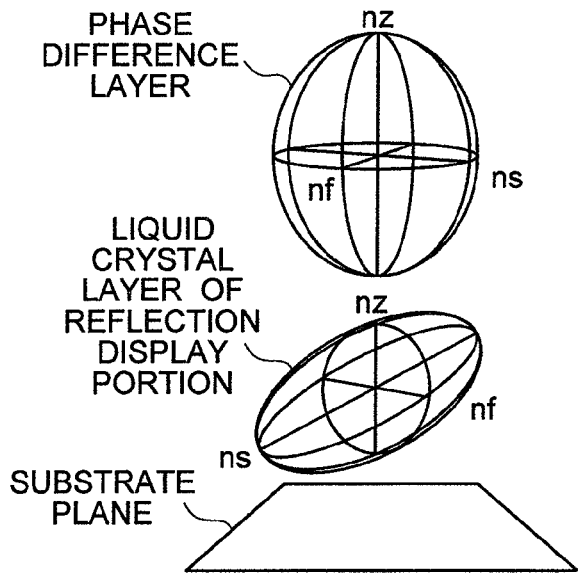

At this time, the refractive index ellipsoids are influenced by the orientation status of mesogen of the liquid crystal molecules, and thus, become convex lens shapes. Accordingly, as shown in FIG. 20C, rotation symmetrical axes of these refractive index ellipsoids are located parallel to the substrate plane. Since the refractive index of the phase difference layer along the substrate normal direction is increased, the refractive index distribution along the substrate plane direction can be balanced with the refractive index distribution along the substrate normal direction.

Figure 21A:
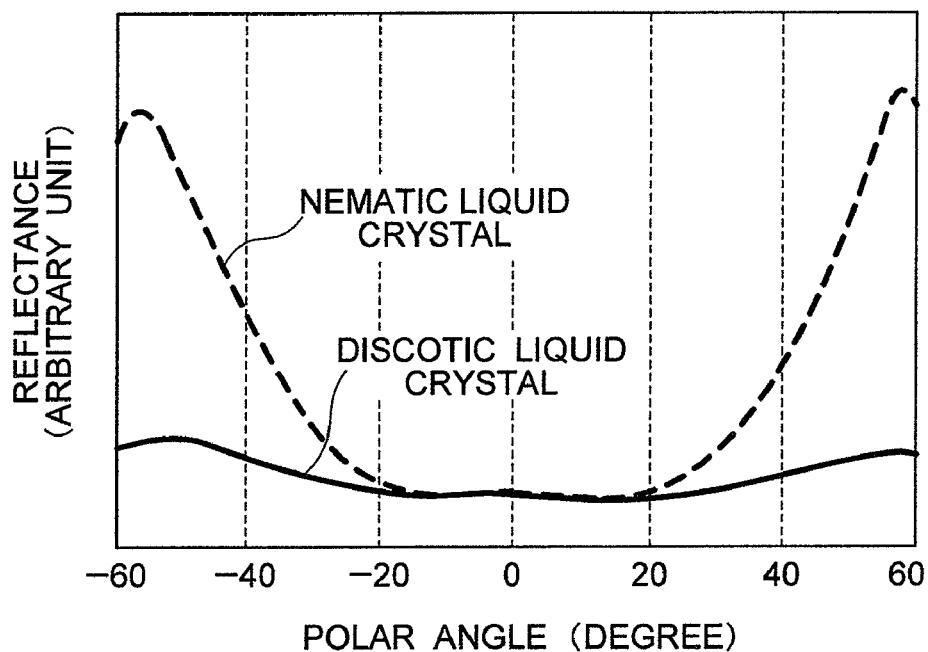
FIG. 21A to FIG. 21B are diagram for representing polar angle dependent characteristics of dark display reflectances in the case that nematic liquid crystal and disotic liquid crystal are employed in phase difference layers.
Figure 21B:
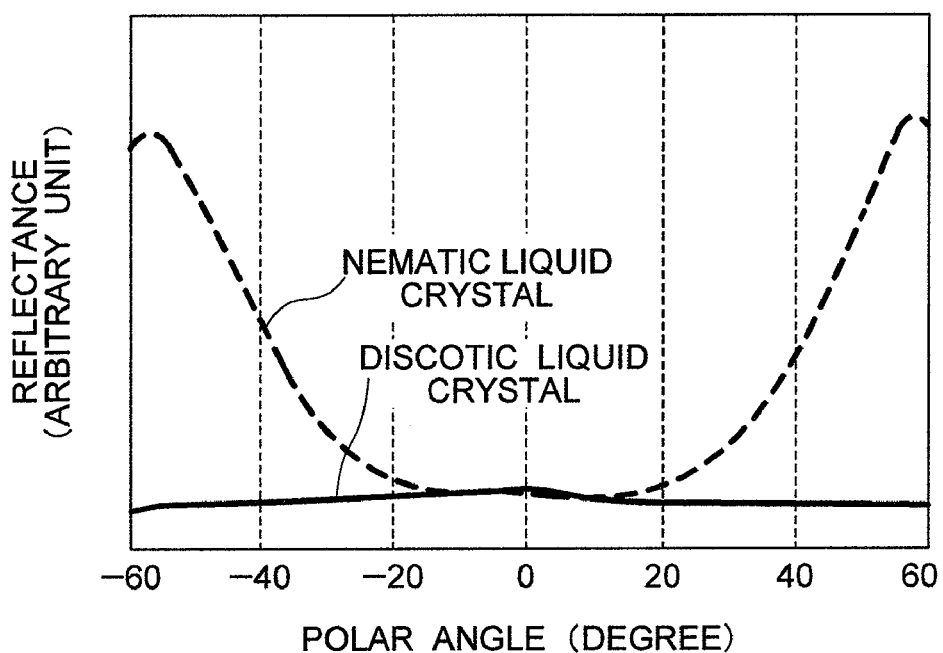

FIG. 21A and FIG. 21B indicate such calculation results that with respect to the reflection display portions represented by the refractive index ellipsoids shown in FIG. 20B and FIG. 20C, visual angle dependent characteristics of reflectances in dark displays have been calculated. Assuming now that a specular reflection occurs with respect to a macro-viewed plane of the reflection layer, an optical path which passes through the reflection display portion has been determined. FIG. 21A shows a polar angle dependent characteristic at an azimuth angle including the liquid crystal orientation direction, and FIG. 21B indicates a polar angle dependent characteristic at an azimuth angle including the vertical direction. Broken lines shown in FIG. 21A and FIG. 21B represent such a case that the nematic liquid crystal is employed in the phase difference layers, and correspond to the refraction index ellipsoid of FIG. 20B. Solid lines shown in FIG. 21A and FIG. 21B represent such a case that the discotic liquid crystal is employed in the phase difference layers, and correspond to the refraction index ellipsoid of FIG. 20C. Although the solid lines are substantially overlapped with the broken lines within a range where the polar angles are ±15 degrees, the reflectances indicated by the broken lines are rapidly increased within such polar angle ranges outside the polar angles of ±15 degrees. In contrast thereto, a reflectance indicated by the solid line is slightly increased from the reflectance of the normal direction in FIG. 21A, and a reflectance indicated by the solid line is decreased from the reflectance of the normal direction in FIG. 21B. As previously described, when the discotic liquid crystal is employed in the phase difference layers, such an effect that the dark display reflectances even in any of the azimuth is decreased could be achieved.

In order to orientate the discotic liquid crystal in such a manner that the disk-shaped mesogen is located perpendicular to the substrate plane, while a horizontal orientation film is employed as the phase difference layer orientation film ALP, a strong rubbing method may be carried out in which the rubbing roll RUL is more strongly depressed when the horizontal orientation film is processed by the orientation process operation in accordance with the rubbing method. Alternatively, a vertical orientation film may be employed as the phase difference layer orientation film ALP, and then, this vertical orientation film may be orientation-processed by the rubbing method. Alternatively, if an acrylic group is conducted into the replacement group of mesogen of the discotic liquid crystal molecules, then the discotic liquid crystal molecules may be optically polymerized so as to be solidified. In this alternative case, the superior thermal resistant characteristic may be achieved, and the orientation status may be held under relatively better condition even in a heating process after the phase difference layer has been formed.

When a contrast ratio of the reflection display was measured by employing an integrating sphere light source, such a reflection contrast ratio could be obtained which was approximately 1.8 times larger than the reflection contrast ratio obtained in such a case that the nematic liquid crystal was employed in the phase difference layer.

Embodiment 8

Figure 22:
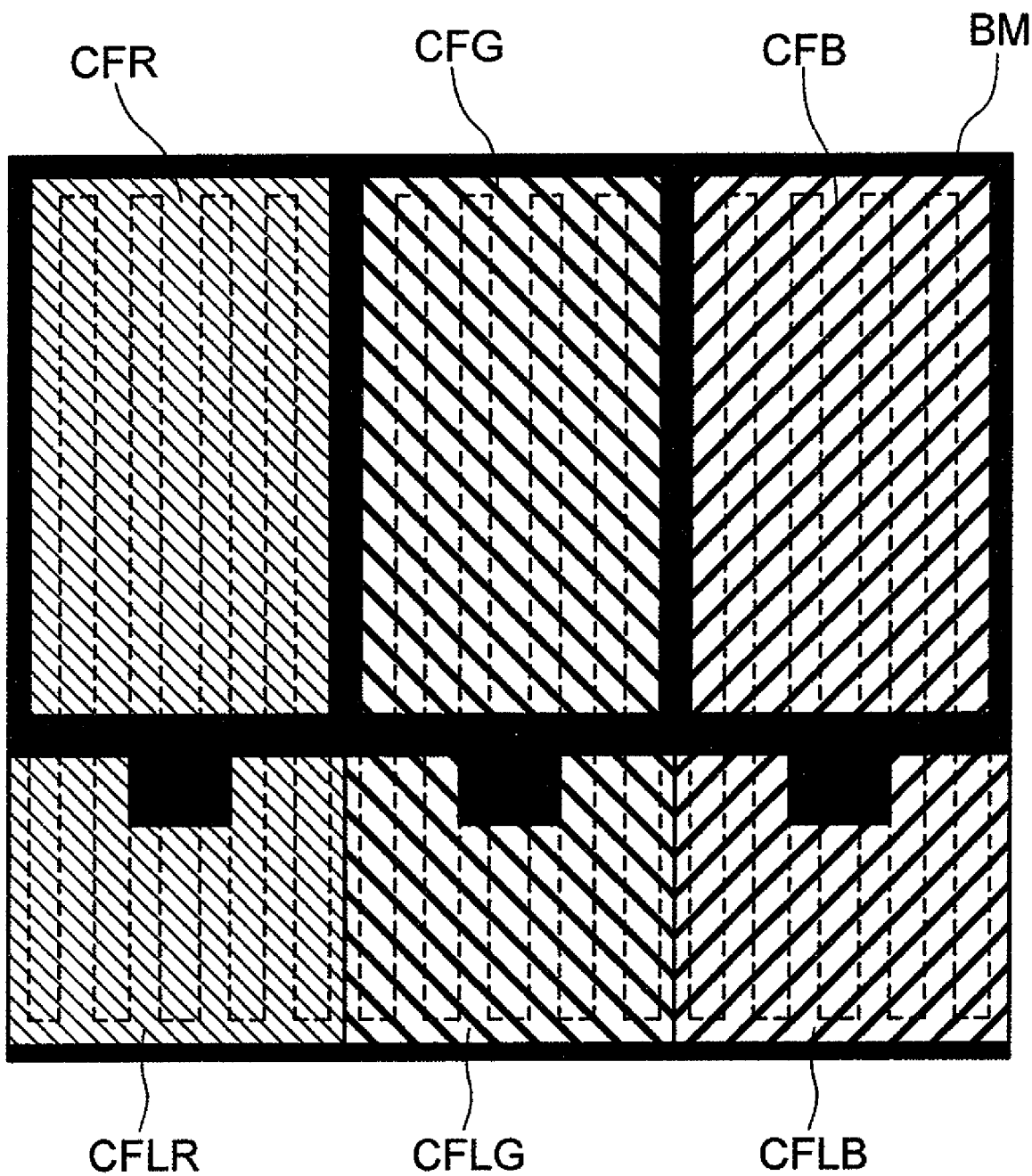
FIG. 22 is a plane view for indicating a structure formed on the first substrate SU1 of the liquid crystal display device according to the embodiment 1.

In the above-described embodiment 1, the color filter empty portion CFH in the reflection display portion was removed. In addition, the color filters having light colors, the layer thicknesses of which were reduced, were arranged in the reflection display portion. FIG. 22 shows a distribution of the color filters under the above-described conditions. In this drawing, a light red color filter "CFLR", a light green color filter "CFLG", and a light blue color filter "CFLB" have been arranged on an entire plane of the reflection display portion made of the red pixel, the green pixel, and the blue pixel. As a result, light absorptions of the color filters in the reflection display portion could be reduced, and the reflection display having the high reflectance could be obtained similar to the above-described embodiment 1.

In the blue pixel, the retardation value of the phase difference layer is changed with respect to those of the red pixel and the green pixel, so that a reflectance in an absorption wavelength range of the blue color filter is increased. Since there is no color filter in the color filter empty portion "CFH", the increase of the reflectance in the absorption wavelength range of the blue color filter cannot be suppressed. In this embodiment 8, since the color filter empty portion CFH is eliminated, the reflection light in the absorption wavelength range of the blue color filter can be reduced.

It should be further understood by those skilled in the art that although the foregoing description has been on embodiments of the invention, the invention is not limited thereto and various change and modifications may be made without departing from the spirit of the invention and the scope of the appended claims.

The invention claimed is:

1. A liquid crystal display device comprising:
   a first substrate;
   a second substrate;
   a liquid crystal layer sandwiched between said first substrate and said second substrate, an orientation status of said liquid crystal layer being a homogeneous orientation when an electric field is not applied thereto;
   a plurality of color filters having at least three colors formed on a plane located in the vicinity of the liquid crystal layer of said first substrate;
   a pixel electrode and a common electrode, which are formed on a plane located in the vicinity of the liquid crystal layer of said second substrate; and a plurality of pixels; a liquid crystal layer of each of said pixels is applied an electric field containing a component parallel to a substrate plane by both said pixel electrode and said common electrode and said pixels have a reflection display portion which has a reflection layer and a transmission display portion; wherein:

said reflection display portion has a phase difference layer formed over a plane near the liquid crystal layer of the first substrate; and a retardation value of the phase difference layer corresponding to at least two color filters having 2 colors is different from a retardation value of the phase difference layer corresponding to another color filter.

2. A liquid crystal display device as claimed in claim 1 wherein:

said color filters are classified into 2 sets of a short wavelength color filter and a long wavelength color filter in response to a wavelength range of transmission light; and retardation values of the phase difference layers corresponding to said short wavelength color filter and said long wavelength color filter are different from each other.

3. A liquid crystal display device as claimed in claim 2 wherein:

the retardation value of the phase difference layer corresponding to said short wavelength color filter is smaller than the retardation value of the phase difference layer corresponding to said long wavelength color filter.

4. A liquid crystal display device as claimed in claim 2 wherein:

said color filters are arranged by a red color filter, a green color filter, and a blue color filter;

a retardation value of a phase difference layer of a pixel corresponding to said red color filter is equal to a retardation value of a phase difference layer of a pixel corresponding to said green color filter; and a retardation value of a phase difference layer of a pixel corresponding to said blue color filter is smaller than the first-mentioned retardation value.

5. A liquid crystal display device as claimed in claim 1 wherein:

said phase difference layer is formed in such a manner that liquid crystal molecules having an optical polymerization characteristic are coated, and the coated layer is irradiated by light so as to be polymerized and solidified; and light irradiation amounts for the phase difference layers corresponding to at least two color filters are different from each other.

6. A liquid crystal display device as claimed in claim 1 wherein:

the light irradiation amount when the phase difference layer of the pixel corresponding to said short wavelength color filter is formed is smaller than the light irradiation amount when the phase difference layer of the pixel corresponding to said long wavelength color filter is formed.

7. A liquid crystal display device as claimed in claim 1 wherein:

a film thickness difference forming layer is formed prior to forming of the phase difference layer on the forming plane of said phase difference layer; and a distribution of said film thickness difference forming layer corresponds to a distribution of such a phase difference layer whose retardation value is smaller.

8. A liquid crystal display device as claimed in claim 1 wherein:

assuming now that the retardation value of the phase difference layer corresponding to the green color filter among said color filters is "Rp" and the retardation value of the liquid crystal layer of the reflection display portion is "Rl", both said retardation values "Rp" and "Rl" are located close to a straight line which is indicated by a relative formula:

$Rp=1.37Rl+86$.

9. A liquid crystal display device as claimed in claim 1 wherein:

slow axis azimuth of said phase difference layer defines an angle of a range near 67.5 degrees with respect to an orientation direction of the liquid crystal layer.

10. A liquid crystal display device as claimed in claim 9 wherein:

at least one of said pixel electrode and said common electrode has any one of a slit structure and a comb-tooth-shaped structure; and a direction of said slit, or azimuth of the comb-tooth direction is located within an angle defined between the slow axis of the phase difference layer and the orientation direction of said liquid crystal layer.

11. A liquid crystal display device as claimed in claim 1 wherein:

said phase difference layer is constructed of discotic liquid crystal having a flat disk-shaped molecular skeleton; and a plane constituted by the molecular skeleton of said discotic liquid crystal is intersected perpendicular to the plane of said first substrate.

12. A liquid crystal display device as claimed in claim 1 wherein:

an Nz coefficient of said phase difference layer is equal to 1.

* * * * *